US010629001B2

(12) United States Patent
Reddy et al.

(10) Patent No.: US 10,629,001 B2
(45) Date of Patent: Apr. 21, 2020

(54) METHOD FOR NAVIGATION IN AN INTERACTIVE VIRTUAL TOUR OF A PROPERTY

(71) Applicant: Samsung Electronics Co., Ltd., Suwon-si, Gyeonggi-do (KR)

(72) Inventors: Gottam Dinesh Reddy, Hyderabad (IN); Sung-dae Cho, Yongin-si (KR); Shin-jun Lee, Yongin-si (KR); Sumedh Mannar, Visakhapatnam (IN); Moo-jung Kim, Seongnam-si (KR); A. Vijay, Ambur (IN); Santle Camilus, Suwon-si (KR); Amit Kumar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 15/061,367

(22) Filed: Mar. 4, 2016

(65) Prior Publication Data

US 2016/0260253 A1 Sep. 8, 2016

(30) Foreign Application Priority Data

Mar. 4, 2015 (IN) .......................... 1061/CHE/2015
Jan. 21, 2016 (IN) .......................... 721/CHE/2015

(51) Int. Cl.
*G06T 19/00* (2011.01)
*G06T 15/20* (2011.01)
(Continued)

(52) U.S. Cl.
CPC .............. *G06T 19/003* (2013.01); *G06T 7/33* (2017.01); *G06T 7/73* (2017.01); *G06T 15/205* (2013.01); *G06T 2210/36* (2013.01)

(58) Field of Classification Search
CPC .................................................... G06T 19/006
See application file for complete search history.

(56) References Cited

U.S. PATENT DOCUMENTS 6,388,688 B1 * 5/2002 Schileru-Key ...... G06F 3/04815
715/854
2008/0086696 A1 * 4/2008 Sri Prakash ........... G06Q 10/00
715/757

(Continued)

FOREIGN PATENT DOCUMENTS

| EP | 2 817 785 A2 | 12/2014 |
|---|---|---|
| KR | 10-2014-0031466 A | 3/2014 |
| KR | 10-1489064 B1 | 2/2015 |

OTHER PUBLICATIONS

Noah Snavely, Steven M. Seitz, Richard Szeliski, "Photo tourism: Exploring photo collections in 3D," ACM Transactions on Graphics (SIGGRAPH Proceedings), 25(3), 2006, 835-846.*

(Continued)

*Primary Examiner* — Phi Hoang
(74) *Attorney, Agent, or Firm* — Jefferson IP Law, LLP

(57) ABSTRACT

A virtual tour application or player provides a virtual environment in which a user can travel. One or more images may be displayed in the virtual tour application or player. The images are blended with each other to enable a user to feel more natural while he or she traveling in the virtual tour. Displaying a virtual tour in an electronic device is provided. A first image which corresponds to a first point included among a plurality of points along a route in a virtual tour is displayed. A second image which is registered with the first image and corresponds to a second point included among the plurality of points and different from the first point is displayed.

19 Claims, 26 Drawing Sheets

(51) Int. Cl.
*G06T 7/73* (2017.01)
*G06T 7/33* (2017.01)

(56) References Cited

U.S. PATENT DOCUMENTS

| | | | |
|---|---|---|---|
| 2010/0042923 A1* | 2/2010 | Barcay | G06T 17/05 715/715 |
| 2012/0127169 A1* | 5/2012 | Barcay | G06T 19/00 345/419 |
| 2014/0006966 A1* | 1/2014 | Geraci | G06Q 30/0259 715/748 |
| 2014/0063064 A1 | 3/2014 | Seo et al. | |
| 2014/0080560 A1* | 3/2014 | Knutsson | A63F 13/12 463/10 |
| 2015/0109509 A1* | 4/2015 | Di Federico | G01C 11/00 348/333.02 |
| 2015/0154798 A1* | 6/2015 | Simpson | G06T 19/003 345/419 |
| 2015/0279012 A1* | 10/2015 | Brown | G06T 5/003 382/284 |
| 2015/0310596 A1* | 10/2015 | Sheridan | G06T 5/50 382/284 |
| 2015/0332494 A1* | 11/2015 | Furukawa | G06T 17/00 345/419 |
| 2015/0363965 A1* | 12/2015 | Wells | G06F 3/017 345/419 |

OTHER PUBLICATIONS

Uricchio, The Algorithmic Turn: Photosynth, Augmented Reality and the Changing Implications of the Image, Visual Studies, Mar. 1, 2011, pp. 25-35, vol. 26, No. 1, XP009178875.

Anonymous, Photosynth—Wikipedia, the free encyclopedia, Feb. 26, 2013, pp. 1-4, XP055131993.

European Summons to oral proceedings dated Oct. 11, 2019, issued in European Patent Application No. 16158769.6.

* cited by examiner

METHOD FOR NAVIGATION IN AN INTERACTIVE VIRTUAL TOUR OF A PROPERTY

CROSS-REFERENCE TO RELATED APPLICATION

This application claims priority from Indian Application No. Numbers, 721/CHE/2015 filed on Jan. 21, 2016 and 1061/CHE/2015 filed on Mar. 4, 2015 in the Indian Intellectual Property Office, the disclosure of which is hereby incorporated by reference herein.

TECHNICAL FIELD

This disclosure generally relates to a virtual tour.

BACKGROUND

Virtual tour provides an immersive three-dimensional experience for a user so that the user may travel freely through the virtual tour. In the virtual tour, a perspective of a virtual camera changes, as the virtual camera moves forward and backward or turns around in the virtual tour. Users may control the movement, orientation, and lens focal length of the virtual camera so the users may freely travel in the virtual tour.

Generally, virtual tour may be generated by stitching together a number of images captured in the real world. Stitched images may be shown as a single panoramic image to user. However, the single panoramic image only presents visual representation of a scene at a fixed point, so user experience may be limited in the virtual tour.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A virtual tour application or player provides a virtual environment in which a user can travel. One or more images may be displayed in the virtual tour application or player. The images are blended with each other to enable a user to feel more natural while he or she traveling in the virtual tour. Displaying a virtual tour in an electronic device is provided. A first image which corresponds to a first point included among a plurality of points along a route in a virtual tour is displayed. A second image which is registered with the first image and corresponds to a second point included among the plurality of points and different from the first point is displayed.

Aspects of this disclosure provide computer-readable instructions, methods, user interface displays, and an electronic device for displaying a virtual tour. A first image which corresponds to a first point included among a plurality of points along a route in a virtual tour is displayed. A second image which is registered with the first image and corresponds to a second point different from the first point included among the plurality of points is displayed.

DESCRIPTION OF EXAMPLE EMBODIMENTS

Figure 1:
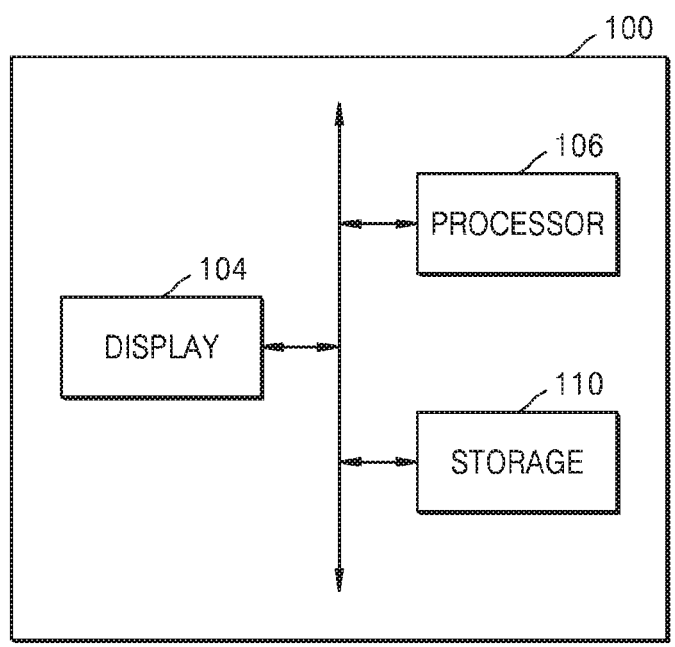
FIG. 1 is a block diagram of an exemplary electronic device for displaying virtual tour, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. Referring now to the drawings, where similar reference characters denote corresponding features consistently throughout the figures.

Image Registration for a Virtual Tour

FIG. 1 is a block diagram of an exemplary electronic device for displaying virtual tour, according to an embodiment. The electronic device 100 may be, for example but not limited to a laptop, a desktop computer, a mobile phone, a smart phone, Personal Digital Assistants (PDAs), a tablet, a smart watch, a phablet, a consumer electronic device, or any other electronic device.

In particular embodiments, the electronic device 100 includes a display 104, a processor 106, and storage 110.

The display 104 may be configured to display a virtual tour including one or more images. The images may be a sequence of images, frames of a video, or a combination thereof. The images may be blended with each other to represent scenes in the virtual tour. Each of the images may correspond to a point where the each of the images is captured. In particular embodiments, the point may be in the form of X and Y coordinates. In particular embodiments, the point may be in the form of X, Y, and Z coordinates.

In particular embodiments, points on which images are captured may compose a route in the virtual tour. The route may be generated based on the points, and the route may be displayed in the virtual tour. For example, the route may be displayed in a map. In particular embodiments, images corresponding to a same point along the route may be stitched with each other to compose a single panoramic image. The images corresponding to a same point along the route may be included in a set of turn images. In particular embodiments, images corresponding to different points along the route may be registered with each other. The images corresponding to different points along the route may be included in a set of images.

In particular embodiments, the virtual tour is rendered by blending a sequence of images. The sequence of images may include a set of images which are captured while a camera capturing the set of images moves forward or backward, and turn images which are captured while the camera capturing the turn images turns around at a certain location. The set of images may correspond to different points along the route. The processor 106 may be configured to control display 104 to display blended images, and the blended image may be displayed continuously, so a user may be provided with an improved user experience while navigating the virtual tour.

The processor 106 may be configured to control components of the electronic device 100 to perform one or more operations for navigating a virtual tour. The processor 106 may be configured to control the display 104 to display the virtual tour. The processor 106 may be configured to control the display 104 to display a first image corresponding to a first point included among a plurality of points along a route in the virtual tour. The processor 106 may be configured to control the display 104 to display a second image corresponding to a second point included among the plurality of points along the route.

In particular embodiments, the first image may be a currently displayed image in the virtual tour, and the first point may be a starting point from which a user moves in the virtual tour or the current location of the user in the virtual tour. In particular embodiments, the second point may be a destination point to which the user moves in the virtual tour, and the second image may be an image destined to be displayed as the user arrives at the destination point in the virtual tour. In an embodiment, the first image and the second image may be registered with each other.

In particular embodiments, the processor 106 may be configured to control the display 104 to display the second image in the virtual tour. In particular embodiments, the processor 106 may be configured to control the display 104 to display the second image in response to an input. As an example and not by way of limitation, the input may be received by an input interface of the electronic device 100, or sensed by a sensor or the electronic device 100, so the second image may be displayed in response to the input such as a touch input, or tilting or shaking of the electronic device 100.

Figure 13:
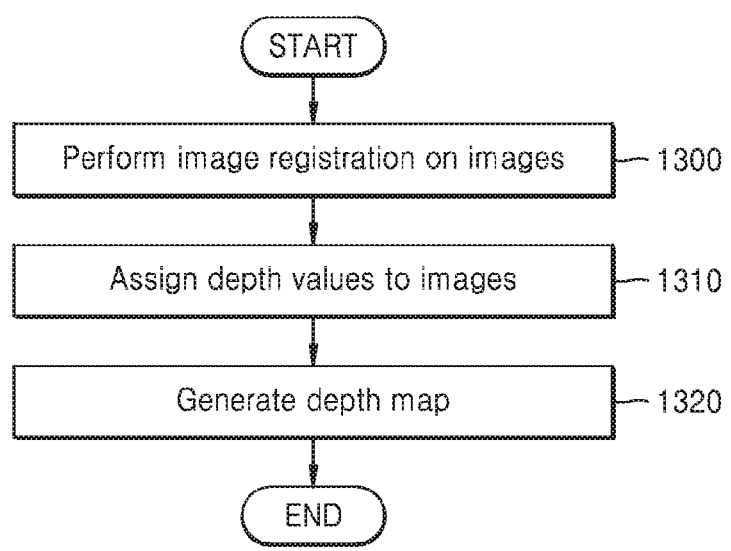
FIG. 13 illustrates an exemplary method for generating a depth map using image registration, according to an embodiment.
Figure 14:
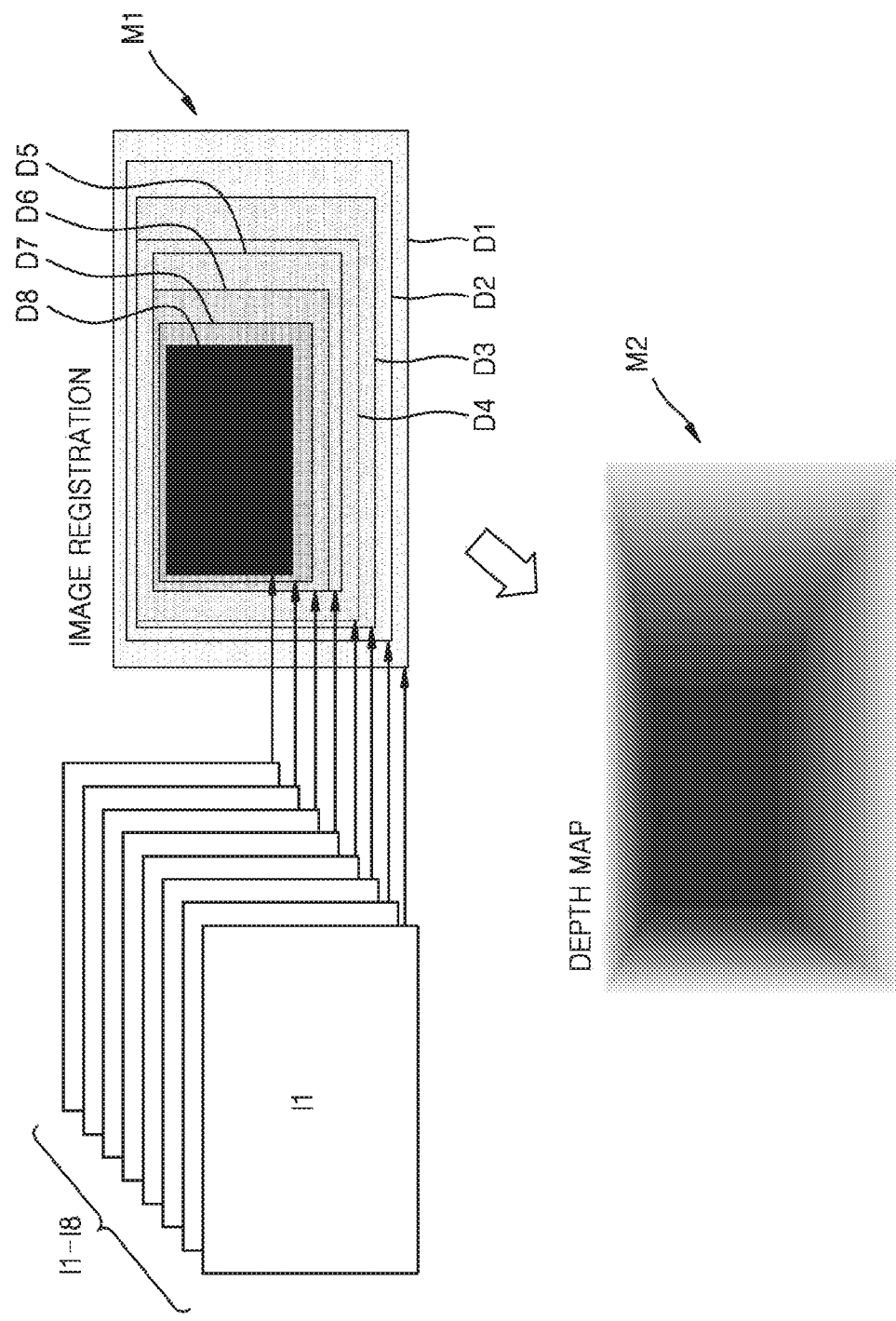
FIG. 14 illustrates an exemplary generating of a depth map using image registration, according to an embodiment.

For explanation of image registration, FIGS. 13, and 14 are referred together. FIG. 13 illustrates an exemplary method for generating a depth map using image registration, according to an embodiment. FIG. 14 illustrates an exemplary generating of a depth map using image registration, according to an embodiment.

The sequence of operations may be performed by the processor 106 of the electronic device 100 or pre-performed by another electronic device. At operation 1300, image registration may be performed on images I1-I8 as shown FIG. 14. As an example and not by way of limitation, the images I1-I8 may be a set of images, which were captured while a camera capturing the set of the images was moving forward.

The image I1 may be a base image which is captured earlier than other images I2-I8. The image I2 comes after the image I1. The image I1 includes a part overlapped with the image I2, since the images I1-I8 were captured while the camera capturing the images I1-I8 was moving forward.

In particular embodiments, the images I1-I8 may be registered based on optical flow of the images I1-I8. The images I1-I8 may be registered in order of capture time of the images I1-I8. The images I1-I8 may be registered in reverse order of capture time of the images I1-I8. Although this disclosure describes and illustrates image registration based on a particular method, this disclosure contemplates any suitable image registration based on any suitable method.

As an example and not by way of limitation, the image I1 may be registered with the image I2, and a size of the registered image D2 in the registered image D1 may be determined based on locations where the images I1 and I2 are captured. The size of the registered image D2 in the registered image D1 may be determined based on distance between locations where the images I1 and I2 are captured. A location of the registered image D2 in the registered image D1 may be determined based on orientation angles of the images I1 and I2 with respect to a reference point, and the reference point may be a point of the image I1 or a point of the image I2. The location of the registered image D2 in the registered image D1 may be determined based on a difference between orientation angles of the images I1 and I2.

The image I1 and the image I2 may be registered with each other based on sides of the image I1 and the image I2, and the sides of the image I1 and the image I2 are oriented toward the same direction. For example, an upper-side of the image I1 and an upper-side of the image I2 may be registered with each other.

At operation 1310, depth values may be assigned to the images I1-I8 or the registered images D1-D8. As an example and not by way of limitation, the lowest depth value may be assigned to the image I1 or the registered image D1. The lowest depth value may be assigned to borders of the image I1 or the registered image D1. The lowest depth value may be assigned to a part not overlapped with the image I2 or the registered image D2. The highest depth value may be assigned to the image I8 or the registered image D8.

At operation 1320, a depth map MI may be generated based on depth values assigned to the images I1-I8 or the registered images D1-D8. Depth values may be assigned to parts not overlapped with following images.

In particular embodiments, one or more depth values may be assigned to the each of the images I1-I8 or the each of the images D1-D8. For example, the lowest depth value may be assigned to borders of the image I1 or the registered image D1, and the second lowest depth value may be assigned to a part not overlapped with the image I2 or the registered image D2. One or more depth values assigned to the image I2 or the registered image D2 may be higher than ones assigned to the image I1 or the registered image D1.

The storage 110 may store images, and the images may include a set of images and turn images. The set of images and the turn images may be pre-stored. Further, the storage 110 may include one or more computer-readable storage media. The storage 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Although this disclosure describes and illustrates a particular electronic device having a particular number of particular components in a particular arrangement, this disclosure contemplates any suitable electronic device having any suitable number of any suitable components in any suitable arrangement.

In particular embodiments, the display 104 may be configured to display at least one indicator in the virtual tour.

A Virtual Tour Player

Figure 2:
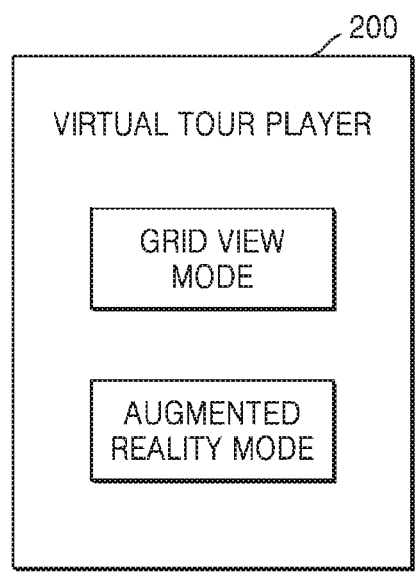
FIG. 2 illustrates an exemplary virtual tour player, according to an embodiment.

FIG. 2 illustrates an exemplary virtual tour player 200, according to an embodiment. In particular embodiments, the storage 110 may store a virtual tour player 200, and the processor 106 may control the virtual tour player 200 to display a virtual tour. The storage 110 may store images and corresponding metadata for the images. The metadata may include information obtained during capture of the images, such as, time information, location information, orientation angle information, rotation information, acceleration information, velocity information, speed information, height information, or inclination information of the images. The information may be obtained by a Global Positioning System, a gyroscope, an accelerometer, a barometer or a combination thereof. In particular embodiments, an accelerometer may be used to ascertain a gravity vector and alignment factor for the images. As another example, parallax of the images may be adjusted based on the relative positions of the images.

In particular embodiments, the virtual tour player 200 may operate in a grid view mode, an augmented reality mode, or a combination thereof. The virtual tour player 200 may have features of play, pause, stop, fast forward, rewind, and seek of a virtual tour. For example, when the virtual tour is played, images may be displayed according to order of corresponding points in a route. For example, when the virtual tour is fast forward, paused or stopped, the play of the virtual tour is fast forwarded, paused or stopped. For example, when the virtual tour is rewound, the images may be displayed in a reverse order from a currently displayed image. In particular embodiments, a progress bar may be displayed in the virtual tour player 200, the seeking of the virtual tour may be performed with aid of the progress bar.

Figure 3:
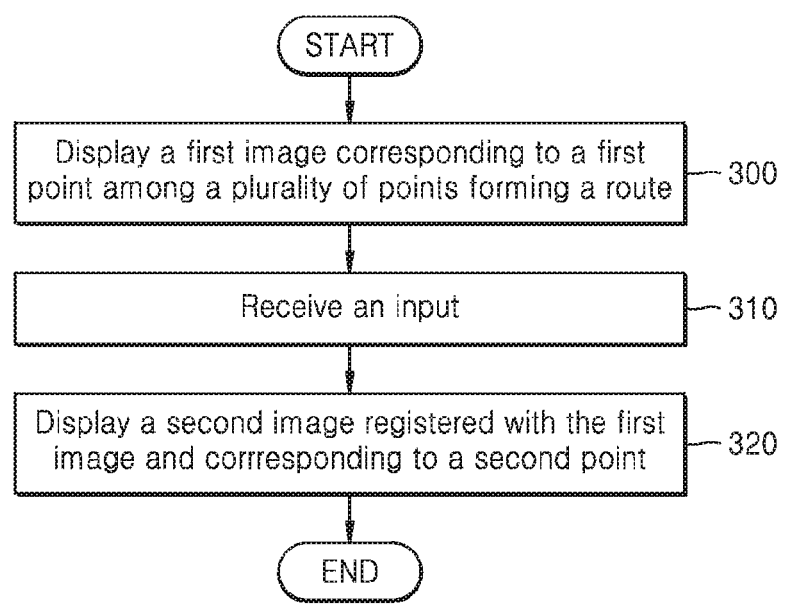
FIG. 3 illustrates an exemplary method for displaying an exemplary virtual tour, according to an embodiment.

FIG. 3 illustrates an exemplary method for displaying an exemplary virtual tour, according to an embodiment. At operation 300, a first image corresponding to a first point included among a plurality of points along a route may be displayed in a virtual tour. In particular embodiments, a map may be displayed with the first image and the route may be displayed in the map. The map may be hidden according to user's selection.

At operation 310, an input may be received. The input may be an input to select a second point included among the plurality of points along the route. The input may be received by tilting or shaking an electronic device displaying the virtual tour. The input may be received by playing the virtual tour.

At operation 320, a second image registered with the first image and corresponding to a second point may be displayed in the virtual tour. The second image may be registered with another image registered with the first image, such that the second image may be registered with the first image. In particular embodiments, the second image and the first image may be a set of images.

In particular embodiments, a virtual tour is rendered by blending a sequence of images based on a depth map. A transition effect may be generated based on the depth map. The transition effect may occur while a user in the virtual tour moves from a first point to a second point. In other words, the transition effect may occur while an image displayed in the virtual tour is changed from a first image to a second image. As an example and not by way of limitation, the first image may be a currently displayed image in the virtual tour, and the first point may be a starting point from which a user moves in the virtual tour or the current location of the user in the virtual tour. In particular embodiments, the second point may be a destination point to which the user moves in the virtual tour, and the second image may be an image destined to be displayed as the user arrives at the destination point in the virtual tour. In an embodiment, the first image and the second image may be registered with each other.

In particular embodiments, depth values of a set of images in a depth map are determined based on distances between points of the set of images. As an example and not by way of limitation, the distances between the points of the set of images may be determined according to an image analysis of the set of images. As an example and not by way of limitation, the image analysis may be based on optical flow of the set of images, or focus of attention and focus of expansion between the set of images. In particular embodiments, the distance between the points of the set of images may be determined based on information sensed during capture of the set of images. The sensed information may be used to count steps taken between locations where the set of images are captured, and the distance between the points of the set of images may be determined based on the number of steps. In particular embodiments, the depth map may be generated using image registration. In particular embodiments, the depth map may be generated using alignment factor, or calibration data of the set of images.

A Grid View Mode of a Virtual Tour

Figure 4:
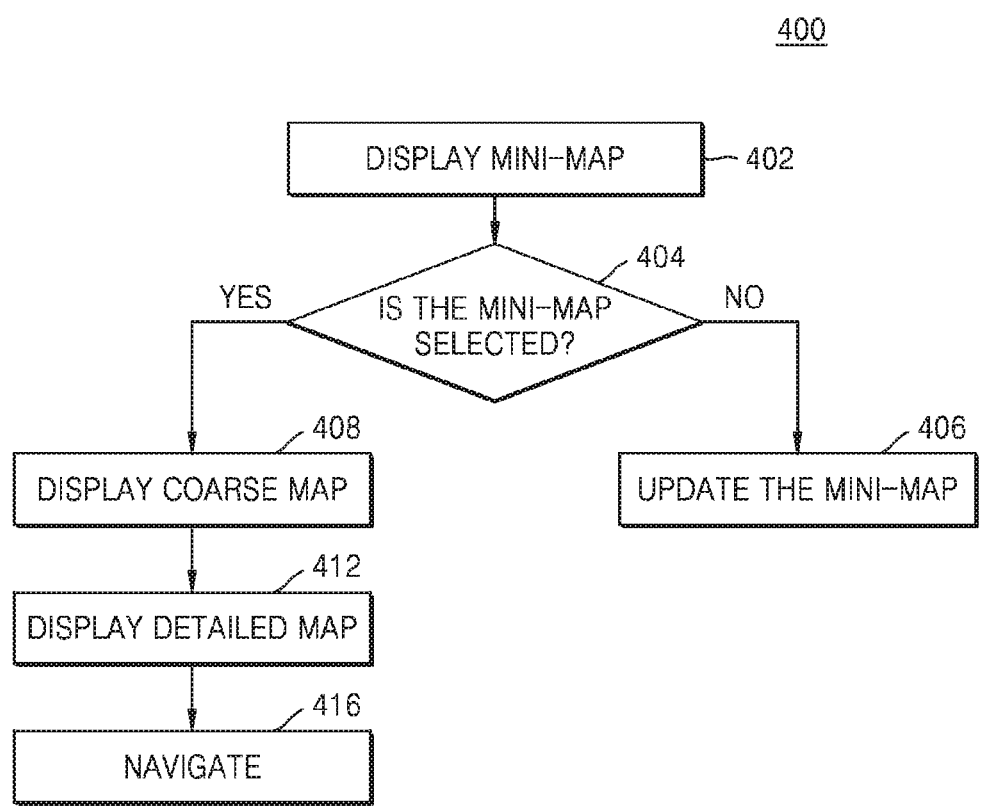
FIG. 4 illustrates an exemplary method for displaying an exemplary multi-level maps, according to an embodiment.
Figure 7A:
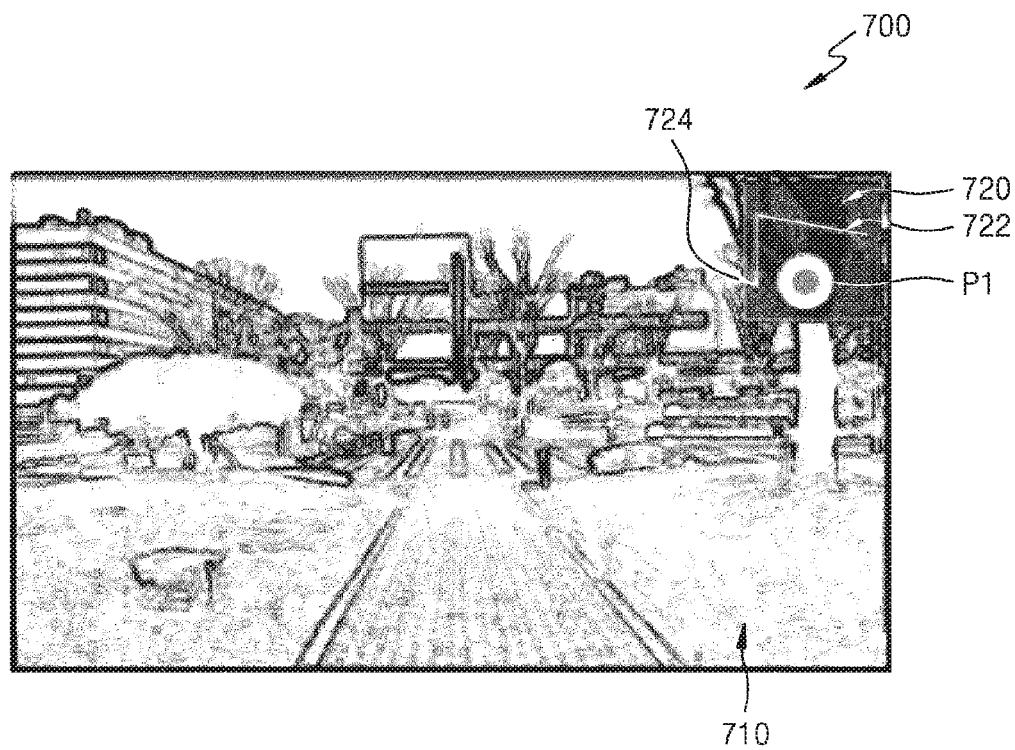
FIGS. 7A-7C illustrate exemplary maps in a virtual tour, according to an embodiment.
Figure 7B:
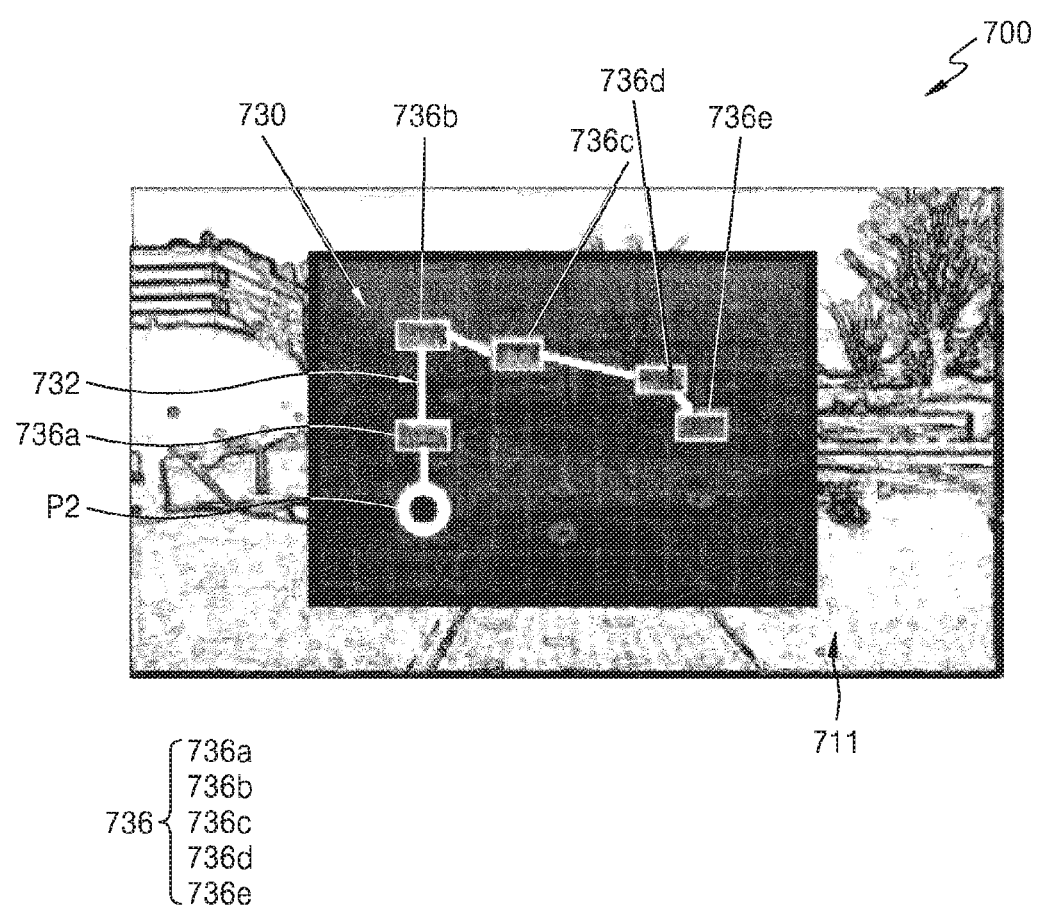
Figure 7C:
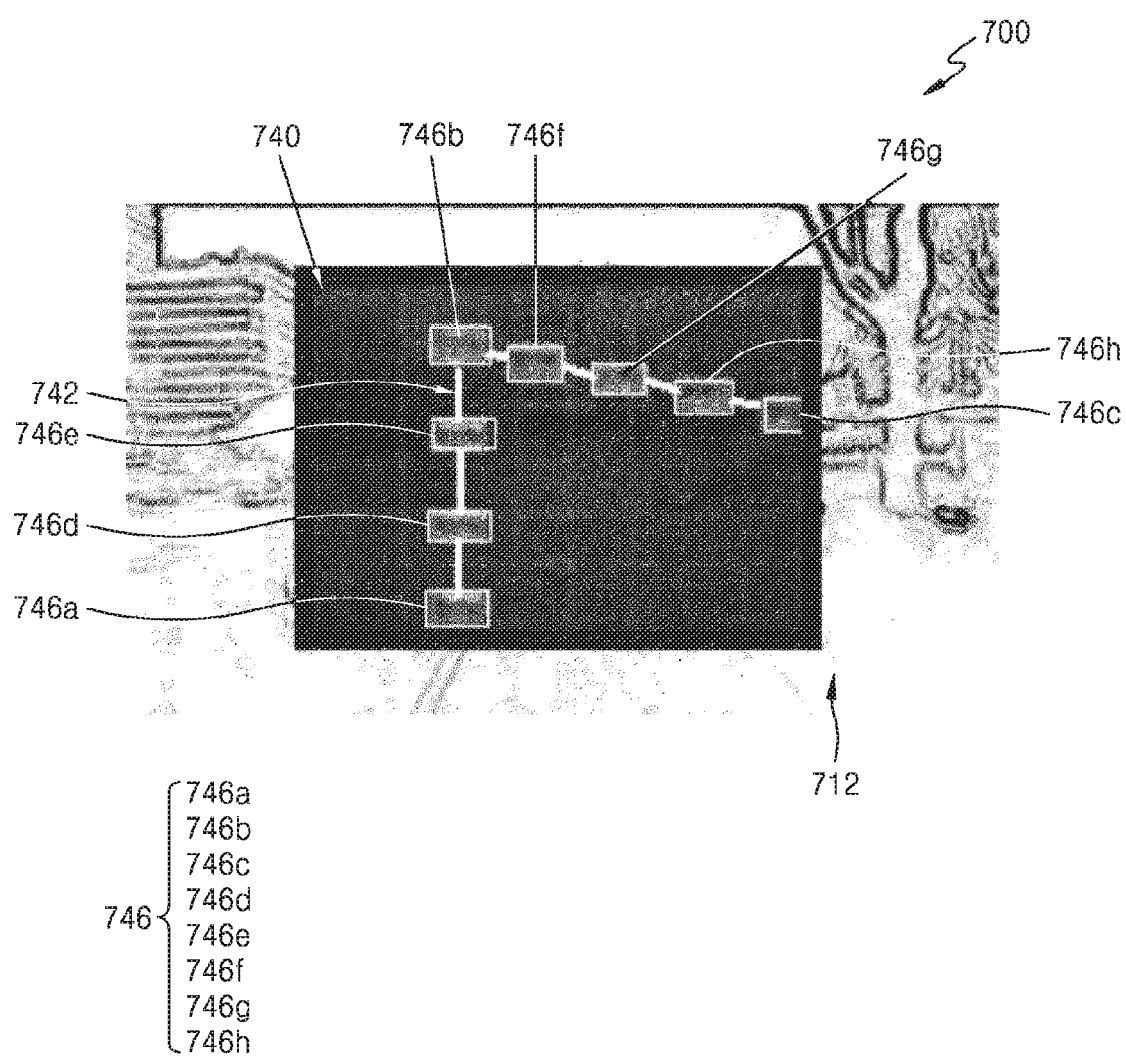

For explanation of a grid view of a virtual tour, FIGS. 4, 7A, 7B, and 7C, are referred together. FIG. 4 illustrates an exemplary method 400 for displaying an exemplary multi-level maps, according to an embodiment. FIGS. 7A-7C illustrate exemplary maps in a virtual tour, according to an embodiment.

In particular embodiments, a virtual tour 700 may be displayed in the grid view mode. At operation 402, a mini-map 720 may be displayed in the virtual tour 700 of the grid view mode. As an example and not by way of limitation, a route 722 may be displayed in the mini-map 720. The route 722 may allow a user know where the user is located in the virtual tour.

If it is determined, at operation 404, that the mini-map 720 is not selected then, at operation 406, the mini-map 720 may be updated. As an example and not by way of limitation, the mini-map 720 may be updated according to the current location 724 of the user in the virtual tour 700 or a direction to which the user is oriented in the virtual tour 700.

If it is determined, at operation 404, that the mini-map 720 is selected by an input P1, at operation 408, a coarse map 730 may be displayed. In particular embodiments, the coarse map 730 may be more detailed than the mini-map 720, and at least one indicator may be displayed in the coarse map 730. As an example and not by way of limitation, indicators may be represented as thumbnails 736 corresponding to images. A plurality of thumbnails 736a, 736b, 736c, 736d, and 736e may be displayed in the coarse map 730. The arrangement of the thumbnails 736 may correspond to the points along the route 732, and the thumbnails 736 may be displayed along the route 732 in the coarse map 730. The distance between thumbnails 736 may correspond to a distance between the points.

The mini-map 720 may be selected based on an input, and the input may be received by an input interface of the electronic device, or sensed by a sensor or the electronic device, so the coarse map may 730 be displayed in response to the input such as a touch input P1, or tilting or shaking of the electronic device.

At operation 412, a detailed map 740 may be displayed in the virtual tour 700. The detailed map 740 may be more detailed than the mini-map 720 or the coarse map 730, and at least one indicator may be displayed in the detailed map 740. Indicator may be represented as thumbnails 746 corresponding to images, and a plurality of thumbnails 746a, 746b, 746c, 746d, 746e, 746f, 746g, and 746h may be displayed in the detailed map 740. In particular embodiments, more thumbnails may be displayed in the detailed map 740 than the coarse map 730.

In particular embodiments, priorities of indicators may be determined based on significance of corresponding images. An electronic device according to particular embodiments may determine, based on priorities of indicators and a level of a map, which indicators are displayed in the map. As an example and not by way of limitation, certain indicators having the same priority may be displayed in the map which has a certain detail level, while other indicators having lower priorities than the indicators having the same priority are not displayed in the map. In particular embodiments, an image captured at a corner or including a corner therein may be more significant than other images. In particular embodiments, an image where colors or brightness changes significantly compared to previous or next images. Order of the images may be determined by order of points in the route or order of capture time of the images.

Referring to FIG. 7B-7C, a thumbnail 746d, 746e, 746f, 746g, or 746h having a certain priority may not be displayed in the coarse map 730, and the thumbnail 746d, 746e, 746f, 746g, or 746h may be displayed in the detailed map 740. In other words, thumbnails 736a, 736b, 736c displayed in the coarse map 730 may have higher priorities than thumbnails 746 displayed in the detailed map 740.

In particular embodiments, the coarse map 730 and the detail map 740 may be displayed together.

In particular embodiments, a detail level of a map 720, 730, or 740 may change by a user's adjustment. The user's adjustment may be received by an input, such as a zoom input, or tilting or shaking of the electronic device. The zoom input may be a touch pinch input. The number of indicators displayed in the map 720, 730, or 740 may vary according to a detail level of the map 720, 730, or 740. The indicators may be thumbnails 736, and 746, and the number of displayed thumbnails 736, or 746 may change as the detail level of the map 720, 730, or 740 changes. For example, more thumbnails may be displayed in the map 720, 730, or 740 as the detail level of the map 720, 730, or 740 increases. As an example and not by way of limitation, a map 740 of the highest detail level may include the most indicators 746. For example, In particular embodiments, a scale of a map 720, 730, or 740 may change by a user's adjustment, and the number of displayed thumbnails 736, or 746 may change as the scale of the map 720, 730, or 740 increases or decreases. In particular embodiments, the scale of the map 720, 730, or 740 may change according to a detail level of the map 720, 730, or 740.

In particular embodiments, a route may be displayed in a map which has a detail level, and the route displayed in the map may be scaled up or down according to the detail level of the map. In particular embodiments, a scale of a map may change by a user's adjustment, and the number of displayed thumbnails may change as the scale of the map increase or decrease. In particular embodiments, the scale of the map may change according to a detail level of the map.

In particular embodiments, at least one indicator may be displayed in the virtual tour 700. As an example and not by way of limitation, the indicator may be represented as a thumbnail corresponding to images. Referring to FIGS. 7A-7C, a plurality of thumbnails may be displayed in a map 720, 730, or 740. The arrangement of the thumbnails may correspond to the points along the route 722, 732, or 742, and the thumbnails may be displayed along the route in the map 720, 730, or 740. The distance between thumbnails may correspond to a distance between the points.

At operation 416, a user may navigate the virtual tour 700 based on the displayed detailed map 740.

Navigation of a Virtual Tour of a Grid View

Figure 5:
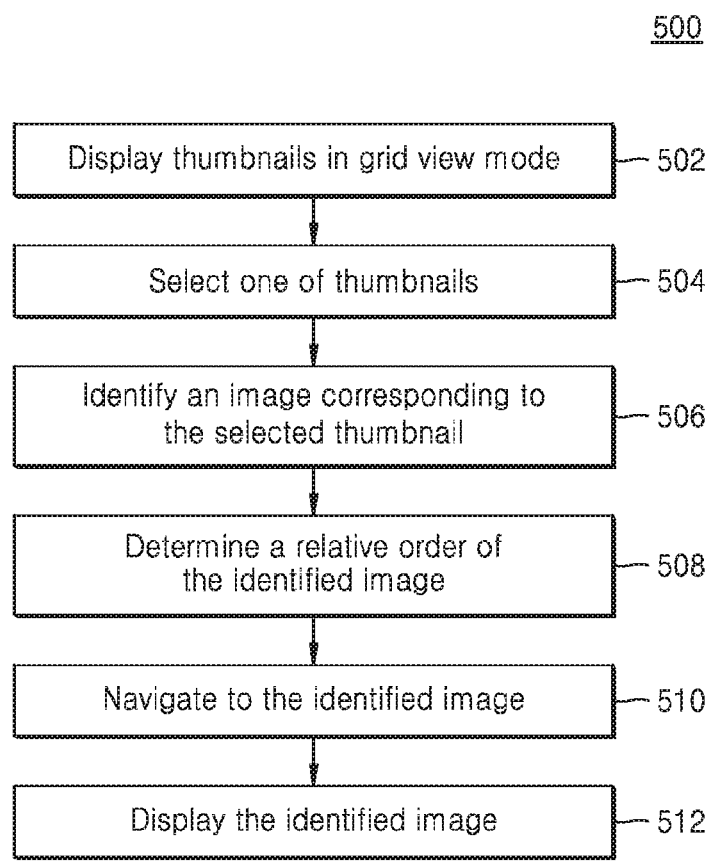
FIG. 5 illustrates an exemplary method for interacting with a virtual tour in a grid view mode, according to an embodiment.
Figure 8:
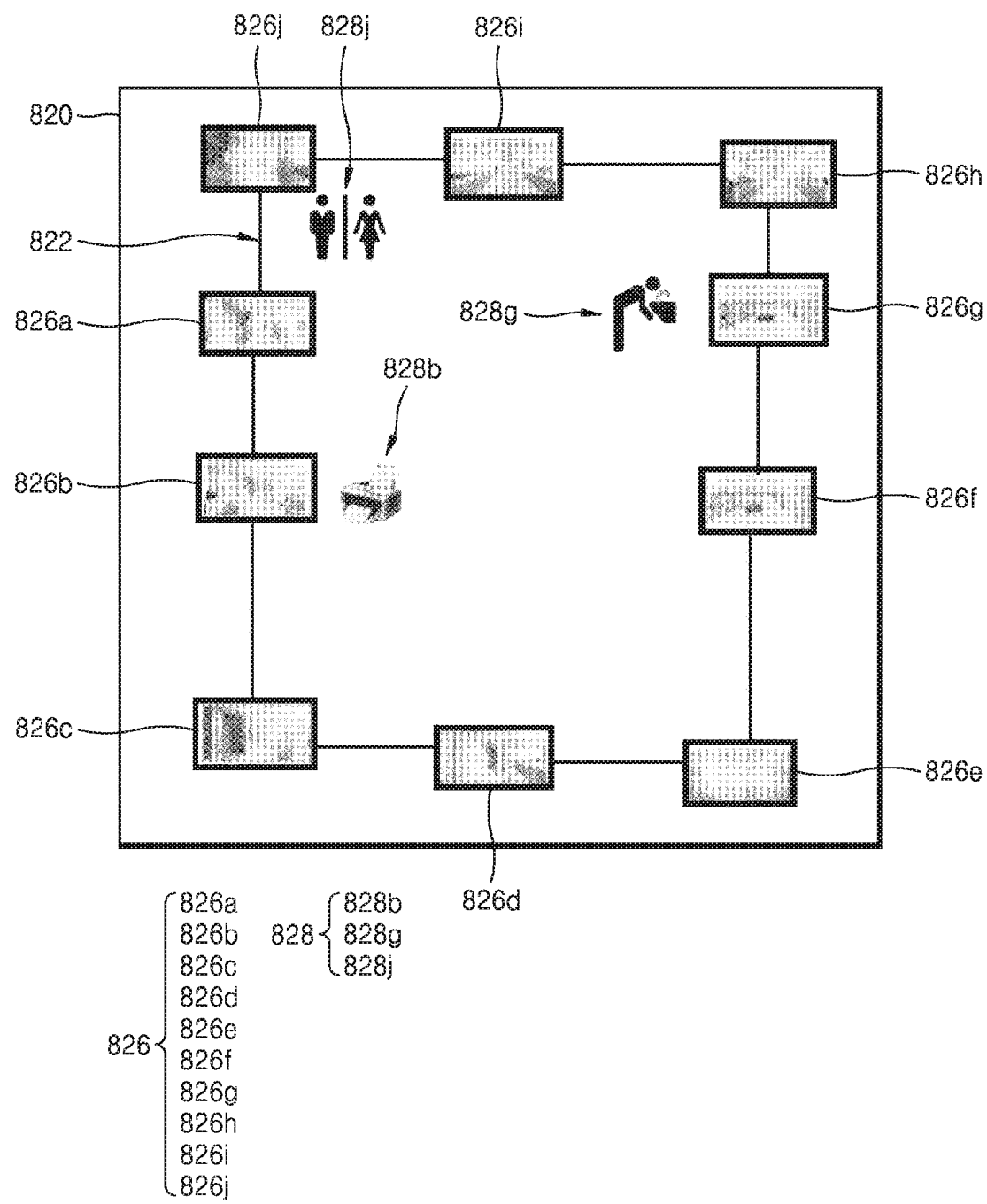
FIG. 8 illustrates an exemplary indoor map in a virtual tour, according to an embodiment.

For explanation of navigation of the virtual tour 700 in the grid view mode, FIGS. 5, and 8 are referred together. FIG. 5 illustrates an exemplary method 500 for interacting with a virtual tour in a grid view mode, according to an embodiment. FIG. 8 illustrates an exemplary indoor map in a virtual tour, according to an embodiment.

At operation 502, the virtual tour operates in the grid view mode. An index of an image currently displayed may be IMG[i]. The image currently displayed may correspond to a thumbnail 826a. At operation 504, an input to select one of thumbnails 826 displayed in a map 820 may be received. The thumbnail 826f may be selected in response to the input. At operation 506, an image corresponding to the selected thumbnail 826f may be identified.

At operation 508, a relative order of the identified image with respect to the image currently displayed in the virtual tour may be determined. For example, an index of the identified image may be determined as IMG[i+n] when the identified image is nth following to the image currently displayed in the virtual tour. For example, the identified image is nth prior to the image currently displayed in the virtual tour, and the index of the identified image may be determined as IMG[i−n]. Referring to FIG. 8, n may be 5 according to the thumbnail 826a corresponding to the image currently displayed in the virtual tour, and the selected thumbnail 826f.

At operation 510, a user in the virtual tour may be navigated to the identified image based on the determined relative order of the identified image. In particular embodiments, when the point corresponding to the selected thumbnail 826f is following to the current point according to order of points or the images, the virtual tour in which an image corresponding to the current point has been displayed may be played or fast forwarded until the image corresponding to the selected thumbnail 826f is displayed in the virtual tour. As an example and not by way of limitation, when the index of the identified image is IMG[i+n], the virtual tour may be played or fast forwarded through images of IMG[i+1], IMG[i+2], . . . , and IMG[i+n−1] until the identified image is displayed. In particular embodiments, speed of the fast forwarding virtual tour may be determined based on the number of images between the images of IMG[i] and IMG[i+n]. For example, the speed of the fast forwarding of virtual tour may be faster, as the more images lies between the images of IMG[i] and IMG[i+n].

In particular embodiments, the point corresponding to the selected thumbnail is prior to the current point according to the order of points or the images, the virtual tour in which the image corresponding to the current point has been displayed may be rewound until the image corresponding to the selected thumbnail is displayed in the virtual tour. As an example and not by way of limitation, the index of the identified image is IMG[i−n], the virtual tour may be rewound through images of IMG[i−1], IMG[i−2], . . . and IMG[i−n+1] until the identified image is displayed. In particular embodiments, speed of the rewinding virtual tour may be determined based on the number of images between the images of IMG[i] and IMG[i−n]. For example, the speed of the rewinding of the virtual tour may be faster, as the more images lies between the images of IMG[i] and IMG[i−n].

At operation 512, the identified image may be displayed. The virtual tour may be played in normal speed according to order of the images or the points after the identified image is displayed.

In particular embodiments, the virtual tour may be played, paused, or stopped, after the user moved to the point corresponding to the selected thumbnail 826f in the virtual tour. The virtual tour in which the image corresponding to the selected thumbnail 826f has been displayed may start to be played according to the order of the points or the images.

In particular embodiments, the virtual tour may be an indoor virtual tour, an outdoor virtual tour, or a combination thereof for a house, an office, garden, a shopping mall, a department store, a hotel, or a resort.

In particular embodiments, the virtual tour may allow a user to tag the thumbnails 826 with a label such as icons 828, so it may be easy for users to notice where an object or a place such as printers, restrooms, drinking water fountains, fire exists, or the like that the user look for is located in the map 820.

In an embodiment, plurality of virtual tours may be combined to generate a single virtual tour by using location information, orientation information, or height information of images of the virtual tours. When the plurality of the virtual tours are indoor virtual tours, and each of the virtual tours correspond to different floors, the height information of images of the virtual tours may be used to determine relations between the plurality of virtual tours and the floors.

In particular embodiments, after the user moved to the point corresponding to the selected thumbnail 826f in the virtual tour, the virtual tour may operate in an augmented reality mode.

An Augmented Reality Mode of a Virtual Tour

Figure 6:
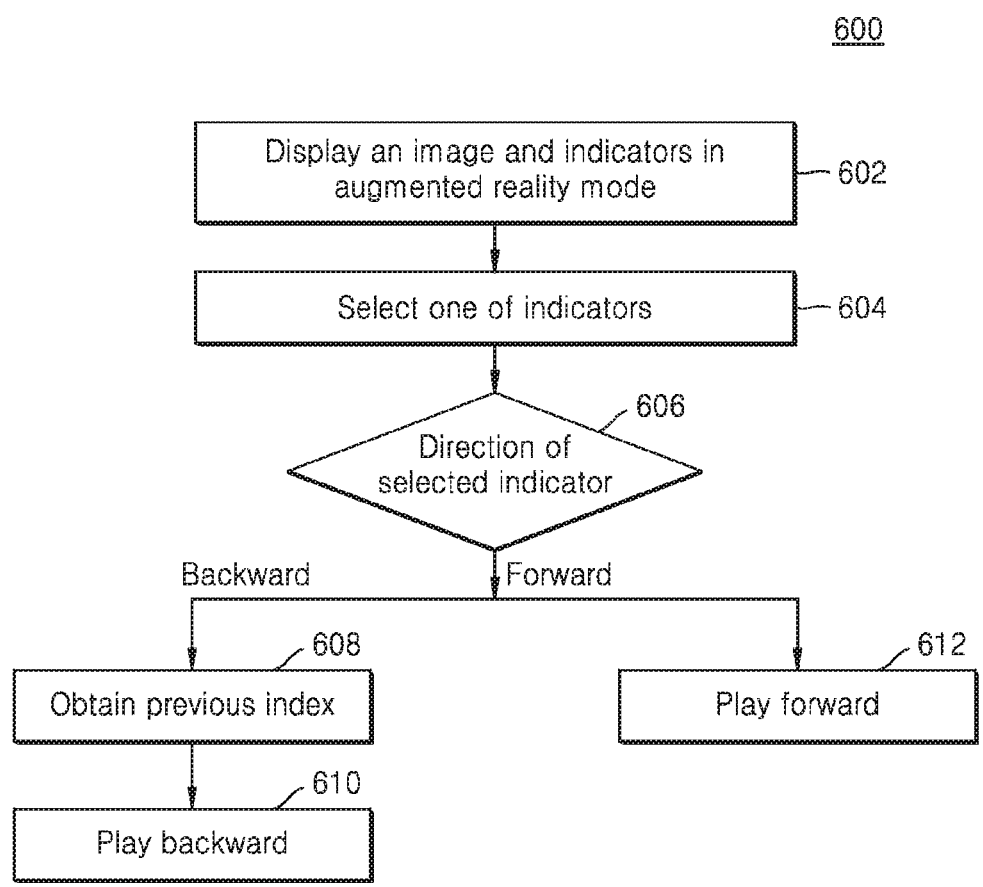
FIG. 6 illustrates an example method for interacting with a virtual tour in an augmented reality mode, according to an embodiment.

For explanation of the augmented reality mode, FIGS. 6, 9A, 9B, and 9C are referred together. FIG. 6 illustrates an example method 600 for interacting with a virtual tour in an augmented reality mode, according to an embodiment.

Figure 9A:
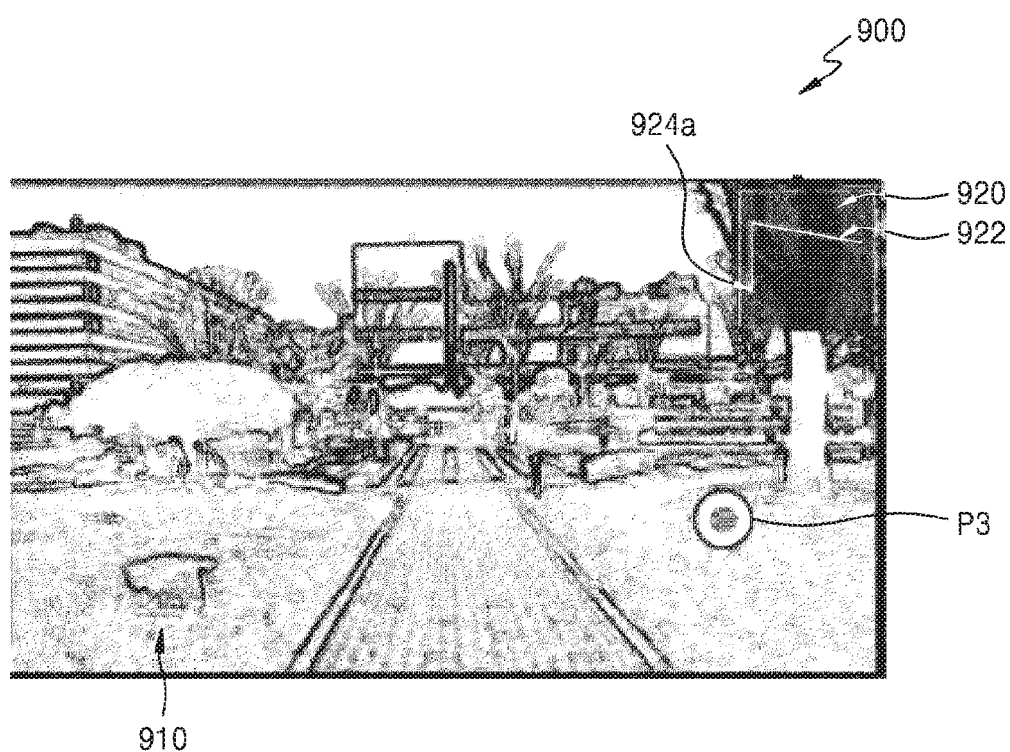
FIGS. 9A-9C illustrate an exemplary navigating of a virtual tour in an augmented reality mode, according to an embodiment.
Figure 9B:
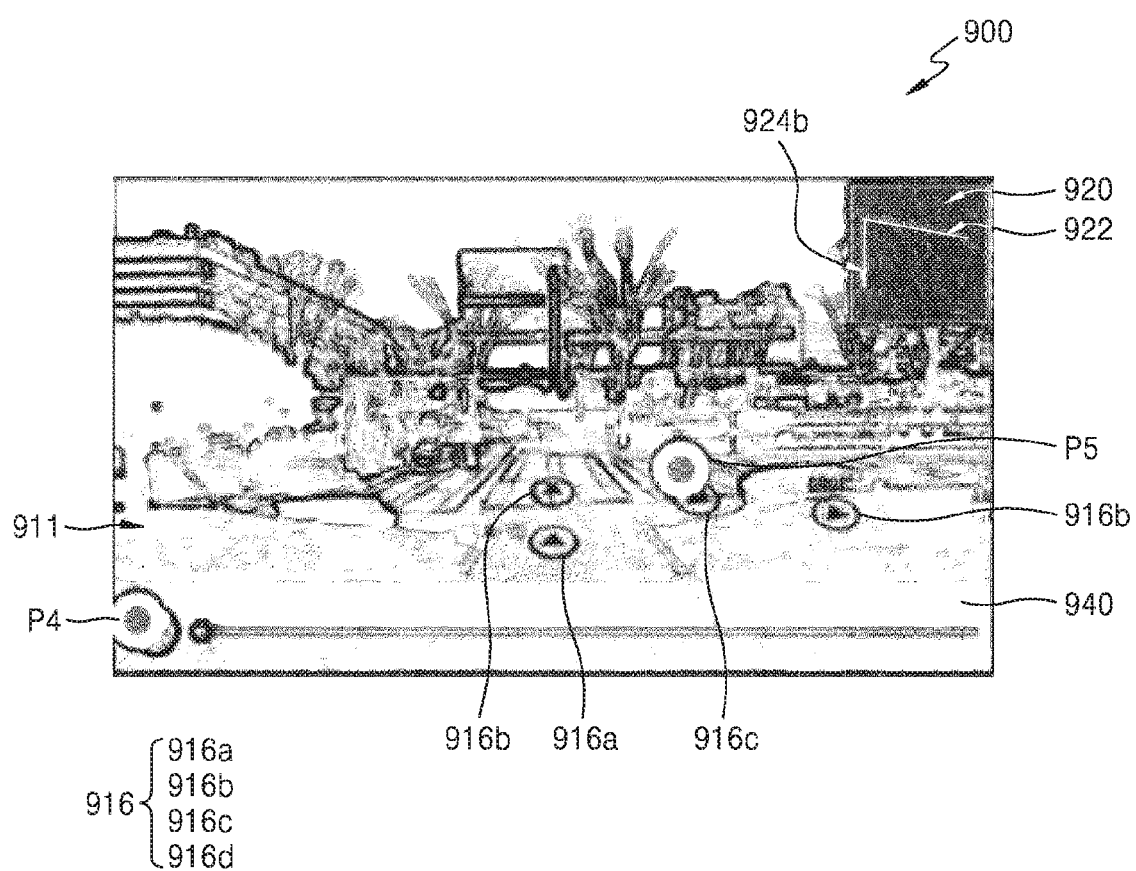
Figure 9C:
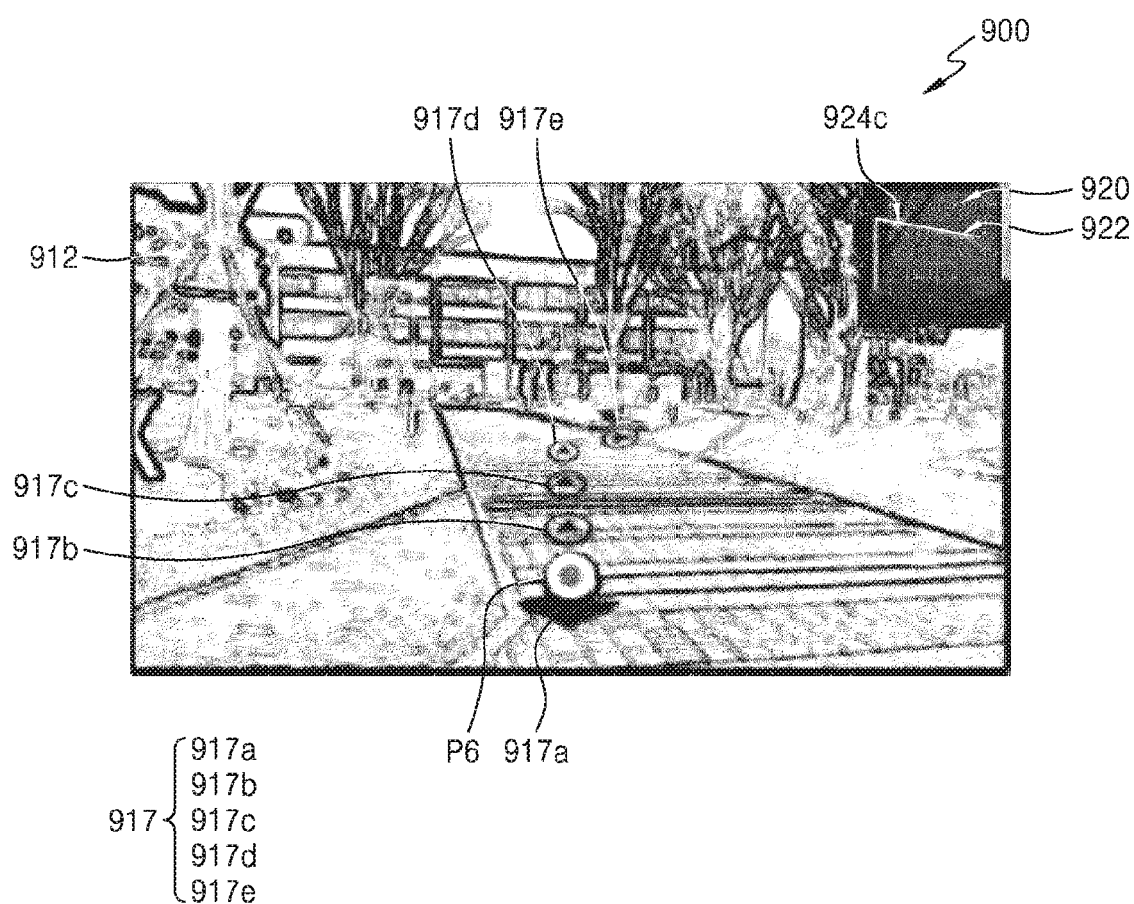

FIGS. 9A-9C illustrate an exemplary navigating of a virtual tour in an augmented reality mode, according to an embodiment.

As shown in the FIG. 9A an image 910 and a mini-map 920 may be displayed in a virtual tour 900. The currently displayed image 910 corresponds to a current point 924a included among points along a route 922. The augmented reality mode may be triggered in the virtual tour 900 in response to an input P3 with regard to the currently displayed image 910.

At operation 602, an image 911 and at least one indicator 916 may be displayed in the virtual tour 900 of an augmented reality mode. An index of the image 911 displayed in the virtual tour 900 of the augmented reality mode may be IMG[i].

In particular embodiments, the at least one indicator 916 may be displayed on the image 911 displayed in the virtual tour 900, and indicators 916 may correspond to the points along the route 922. The location of the indicators 916 displayed on the image 911 may correspond to locations and orientation angles of the points with respect to a reference point. In particular embodiments, the location of the indicators 916 displayed on the image 911 may correspond to an image analysis of images or image registration of the images. Referring to FIG. 9B, images corresponding to indicators 916A and 916B may be included in a first set of images, images corresponding to indicators 916B, 916C, 916D may be included in included in a second set of images, and images corresponding to an indicator 916B may be included in a set of turn images. As a member of the first set of images, the images corresponding to indicators 916A and 916B may be registered with each other, and the registered image of an indicator 916B is overlapped with the registered image of an indicator 916A. The location of the indicators may be determined according to a location of the registered image of an indicator 916B in the registered image of an indicator 916A.

In particular embodiments, locations of the indicators 916 or distances between the indicators 916 may correspond to distances between the current point 924b and points corresponding to the indicators 916. In particular embodiments, the locations of the indicators 916 may correspond to distances between the point corresponding to the indicators 916 and prior points in the route 922. As an example and not by way of limitation, a size or a shape of a graphic representation of the indicators 916 such as arrows or triangles, may correspond or be proportional to the distances.

In particular embodiments, the indicators 916 may correspond to orientation angles of the current point 924b and points corresponding to the indicators 916 with respect to a reference point. The reference point may be the current point 924b or one of the points corresponding to the indicators 916. In particular embodiments, the indicators 916 may correspond to orientation angles of the points corresponding to the indicators 916 and prior points in the route 922 with respect to a reference point. The reference point may be one of the points corresponding to the indicators 916 or one of the prior points in the route 922. As an example and not by way of limitation, the indicators 916 may correspond to differences between orientation angles of the point corresponding to the indicators 916 and prior points in the route 922, a direction of a graphic representation of the indicators 916 such as arrows or triangles may correspond to the orientation subtracted by orientation angles of the point corresponding to the indicators 916 from orientation angles of the prior points in the route 922.

In particular embodiments, the indicators 916 may correspond to directions from the current point 924b to points corresponding to the indicators 916. In particular embodiments, the indicators 916 may correspond to directions from prior points to the points corresponding to the indicators 916. As an example and not by way of limitation, a direction of the graphic representation of the indicators 916 may correspond to the directions.

In particular embodiments, the indicator 916 may correspond to a progress direction on the route 922 in the virtual tour 900.

In particular embodiments, an indicator corresponding to a current point of a user in the virtual tour or an indicator closest to the current point may be displayed in the bottom-middle of a currently displayed image. In particular embodiments, a location of indicators may be determined based on a location of the indicator corresponding to the current point and a depth map generated based on registration of a set of images including the currently displayed image.

In particular embodiments, the distances, the orientation angles, the difference between the orientation angles, or the direction may be determined based on at least one of an image analysis of corresponding images and information sensed during capture of corresponding images. As an example and not by way of limitation, the image analysis may be based on optical flow of the first and second images, or focus of attention and focus of expansion between the first and second images.

In particular embodiments, the sensed information may be used to count steps taken between locations where the corresponding images were captured, and the distances may be determined based on the number of steps between points. In particular embodiments, the indicator may be displayed with a label representing the number of steps.

In particular embodiments, the indicators 916 may correspond to displacements from the current point 916b to the points corresponding to the indicators 916. The displacements may be determined based on at least one of the image analysis of the corresponding images, and information sensed during capture of the corresponding images In particular embodiments, the indicator may correspond to a moving distance from the current point 916b to the points corresponding to the indicators 916. The moving distance from the current point 916b to the points corresponding to the indicators 916 may be determined based on at least one of the image analysis and the information sensed during capture of the corresponding images.

At operation 604, an input P5 to select one of the indicators 916 may be received. An index of the selected indicator 916c may be obtained. In particular embodiments, the index of the selected indicator 916c may be obtained based on a distance between points 924b and 924c of the displayed image 911 and an image 912 destined to be displayed. The index of the selected indicator 916c may be "i+n", and an index of the image 912 corresponding to the selected indicator 916c may be IMG[i+n].

At operation 606, a direction of the selected indicator 916c may be determined.

At operation 608, when the direction of the selected indicator 916c is backward direction, previous indexes may be obtained, that is, indexes of prior points in the route may be obtained.

At operation 610, when the direction of the selected indicator 916c is backward direction, "n" is negative and the virtual tour may be played in backward direction from the image 911 of IMG[i] to the image 912 of IMG[i+n] destined to be display, that is, to be rewound.

At operation 612, when the direction of the selected indicator 916c is forward direction, "n" is positive and the virtual tour may be played in forward direction from the image 911 of IMG[i] to the image 912 of IMG[i+n] destined to be display In particular embodiments, a progress bar 940 may be displayed in the virtual tour 900, the seeking of the virtual tour 900 may be performed with aid of the progress bar 940. For example, an input P4 to select "play" or "pause" may be received to play or to pause the virtual tour 900.

Referring to FIG. 9C, the image 912 may be displayed in the virtual tour 900 where indicators 917 may be displayed. An indicator 917a may correspond to a point prior to the 916c. When the indicator 917a is selected by an input P6, the virtual tour may be rewound. For example, the image 911 may be displayed again.

Figure 10:
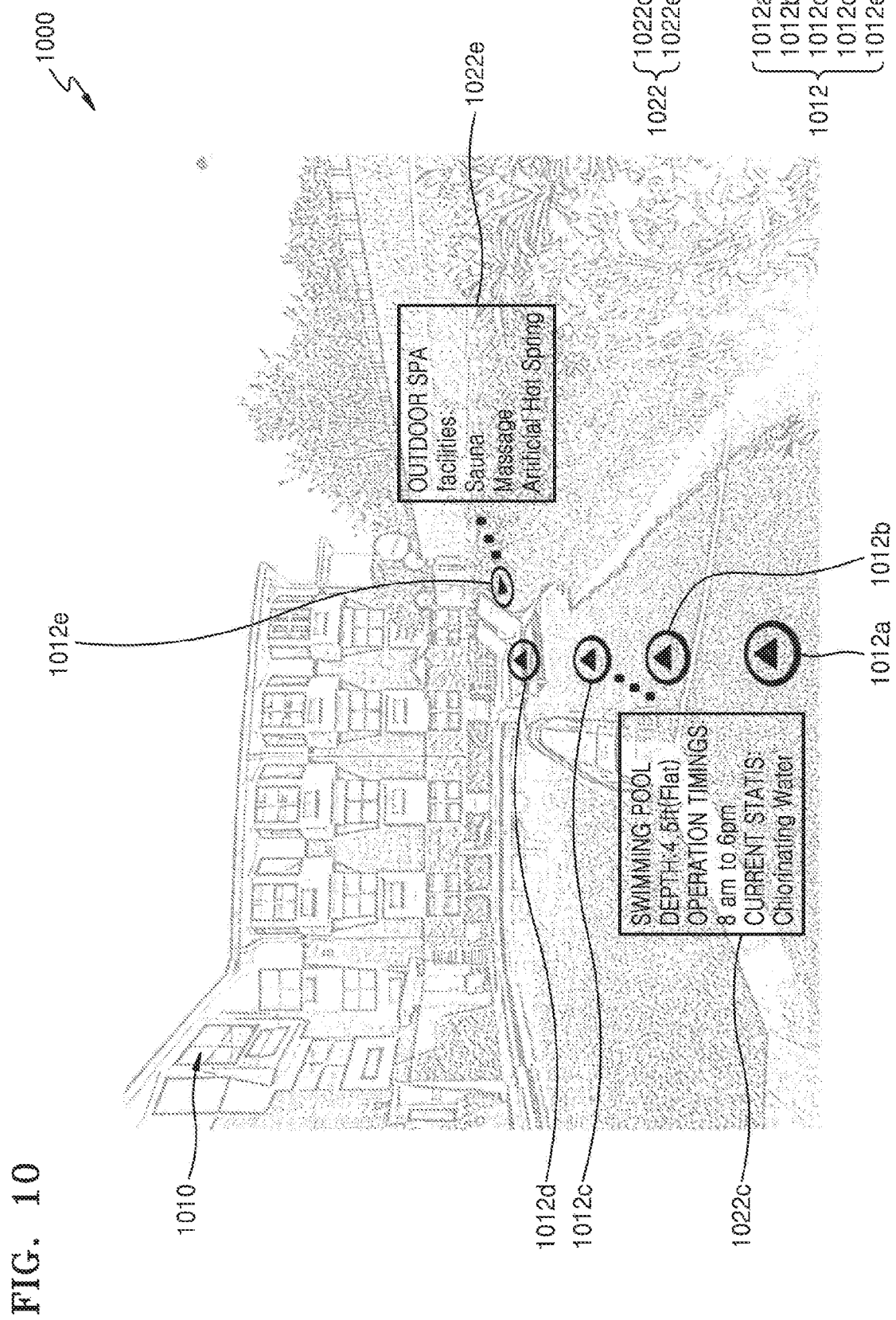
FIG. 10 illustrates an exemplary scene of a virtual tour in an augmented reality mode, according to an embodiment.

As an example and not by way of limitation, additional information related to an image or a point may be displayed in the augmented reality mode. In particular embodiments, the additional information may be related to a point where the image is captured. In particular embodiments, the grid view mode or the augmented reality mode may be triggered in response to a user input. A virtual tour may be displayed according to inputs by a user. In particular embodiments, FIG. 10 illustrates an exemplary scene of a virtual tour in an augmented reality mode, according to an embodiment. The various scenarios are described below. Referring to FIG. 10, a image 1010 may be displayed in a virtual tour 1000, and indicators 1012 may be displayed on the image 1010. Locations of indicators 1012 may be determined based on locations and orientation angles of points forming a route in the virtual tour 1000. In particular embodiments, the indicators 1012 may correspond to orientation angles of points. The indicators 1012 may correspond to a difference between orientation angles of a first point and a second point next to the first point. For example, directions at which the indicators 1012 points may be determined the difference between orientation angles of the first point and the second point next to the first point.

Referring to FIG. 10, first images corresponding to indicators 1012a, 1012b, 1012c, and 1012d may be included in a first set of walk images, and second images corresponding to indicators 1012d, and 1012e may be included in a second set of walk images. At least one image corresponding to an indicator 1012 may be turn images. Locations of the indicators 1012a, 1012b, 1012c, and 1012d or distances between the indicators 1012a, 1012b, 1012c, and 1012d may be determined based on a depth map which is generated based on registration of the first images.

Virtual Tour Application without Position Tracking:

The users (or guests) may be provided with a virtual tour for a hotel.

Static data 1022e such as names and brief description of the facilities and its location such as Lounge, Gymnasium, swimming pools, or the like provided by hotel management.

Virtual Tour Application with Position Tracking:

In guiding the users to their respective rooms, the run-time pop-up data in the augmented reality mode provides assistance to the users.

Virtual Tour Application with Data Update Feature:

Additionally, updates 1022c from the hotel may be received and the virtual tour in a user device may be updated accordingly. For example, operational times of the facilities, cuisine information for various restaurants or the like may be updated.

In an embodiment, hotels and shopping malls may provide either tablets or mobile applications to users for virtual tours of the hotels and the shopping malls. These applications may receive an update from an internet-based server maintained by the hotels and the shopping malls. Wireless-Fidelity (Wi-Fi) based Positioning System fused with Global Positioning System (GPS) data may be used to enable real-time tracking (i.e., tracking data is used to traverse or seek the virtual tour and render accordingly).

Figure 11:
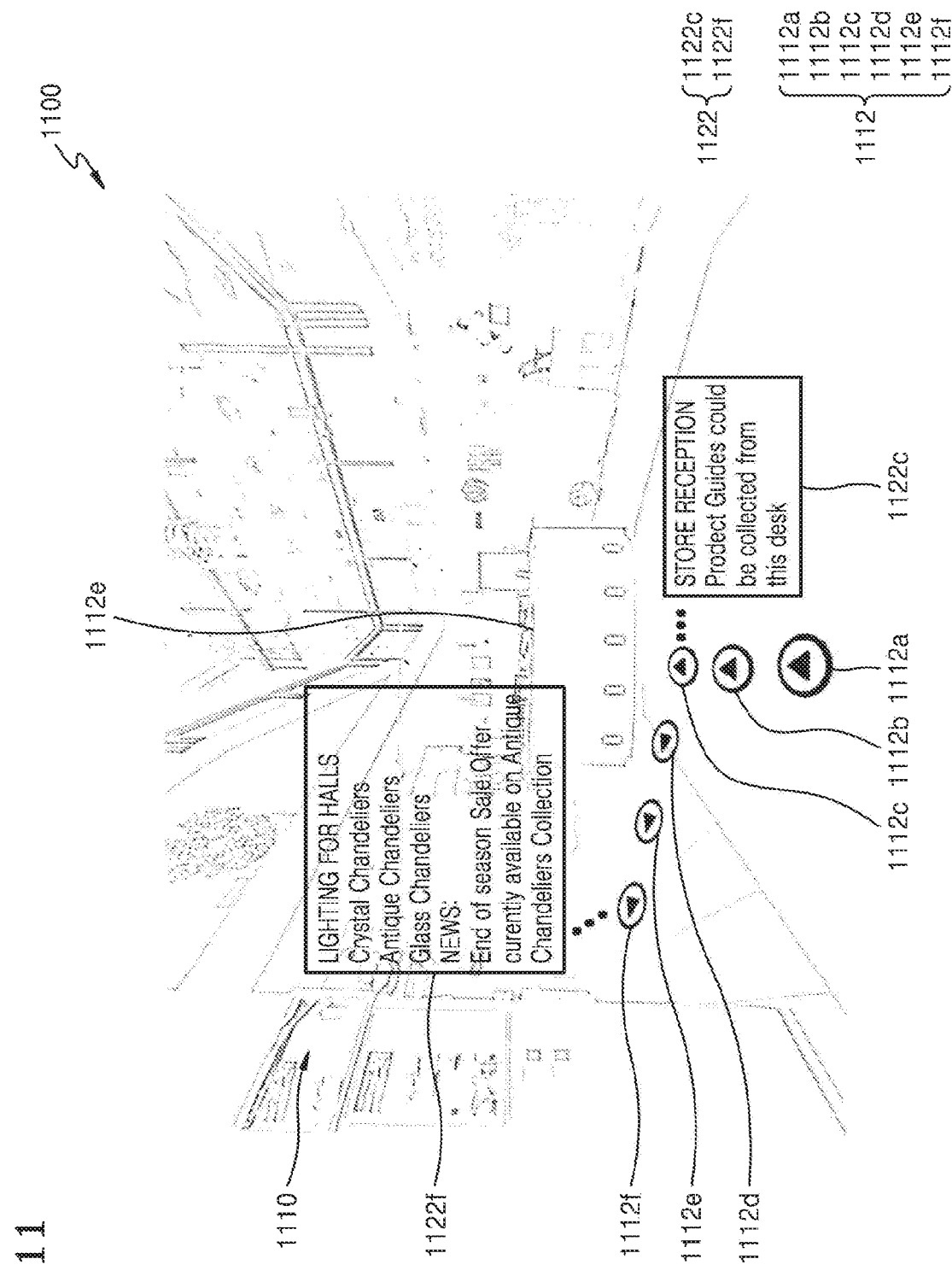
FIG. 11 illustrates an exemplary scene of a virtual tour in an augmented reality mode, according to an embodiment.

FIG. 11 illustrates an exemplary scene of a virtual tour in an augmented reality mode, according to an embodiment. Referring to FIG. 11, a image 1110 may be displayed in a virtual tour 1100, and indicators 1112 may be displayed on the image 1110.

The various scenarios are described below where the user is navigated through the virtual tour of the shopping malls.

Virtual Tour Application without Position Tracking:

The users may be provided with a virtual tour having multi-level map features. The static data 1122c such as names and brief description of specific stores, cinemas, or the like may be displayed in the augmented reality mode.

Virtual Tour Application with Position Tracking:

Additionally, the virtual tour and the multi-level maps may be based on the tracking data in real time. The augmented reality mode provides scene data in the vicinity of current position of the users in real time, and which may provide the user with scene information of an area the user is walking into.

Virtual Tour Application with Data Update Feature:

Updates 1122f from the offices may be received in a user device, and displayed in the virtual tour. For example, discounts and sale offers, arrival of new collections, or the like may be displayed in the virtual tour in response to receiving the updates.

Figure 12:
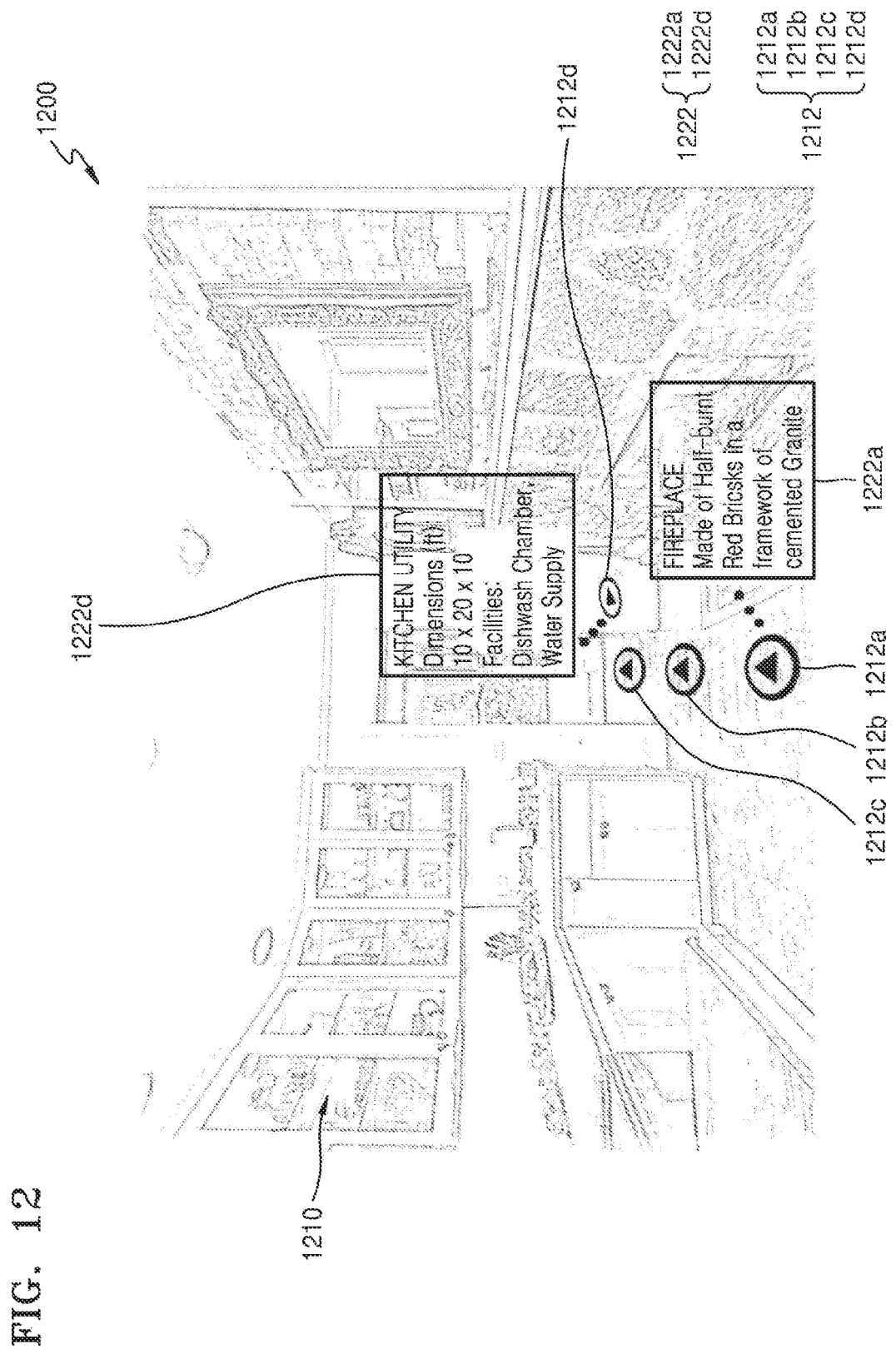
FIG. 12 illustrates an exemplary scene of a virtual tour in an augmented reality mode, according to an embodiment.

FIG. 12 illustrates an exemplary scene of a virtual tour in an augmented reality mode, according to an embodiment. Referring to FIG. 12, a image 1210 may be displayed in a virtual tour 1200, and indicators 1212 may be displayed on the image 1210.

As shown in the FIG. 12, the virtual tour 1200 of the home (i.e., property) for sale may be displayed in a user device. The static data 1222d such as room purpose, dimensions, and brief description 1222a of style and nature of amenities are displayed in the augmented reality mode.

Image Registration Based on Distances

Figure 15:
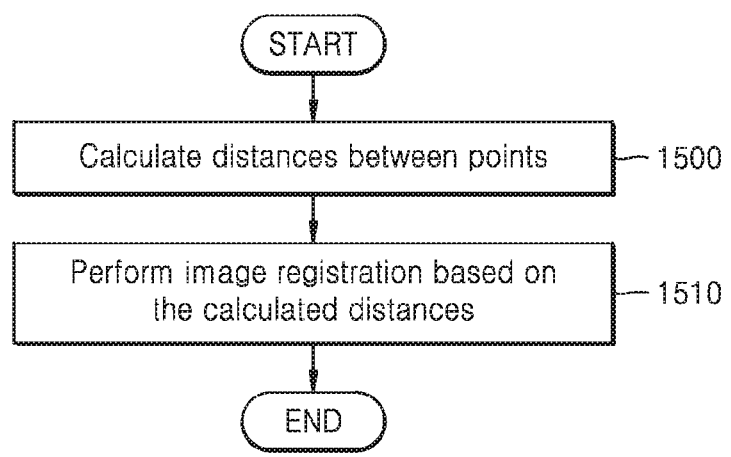
FIG. 15 illustrates an exemplary method of image registration based on distances between points, according to an embodiment.
Figure 16A:
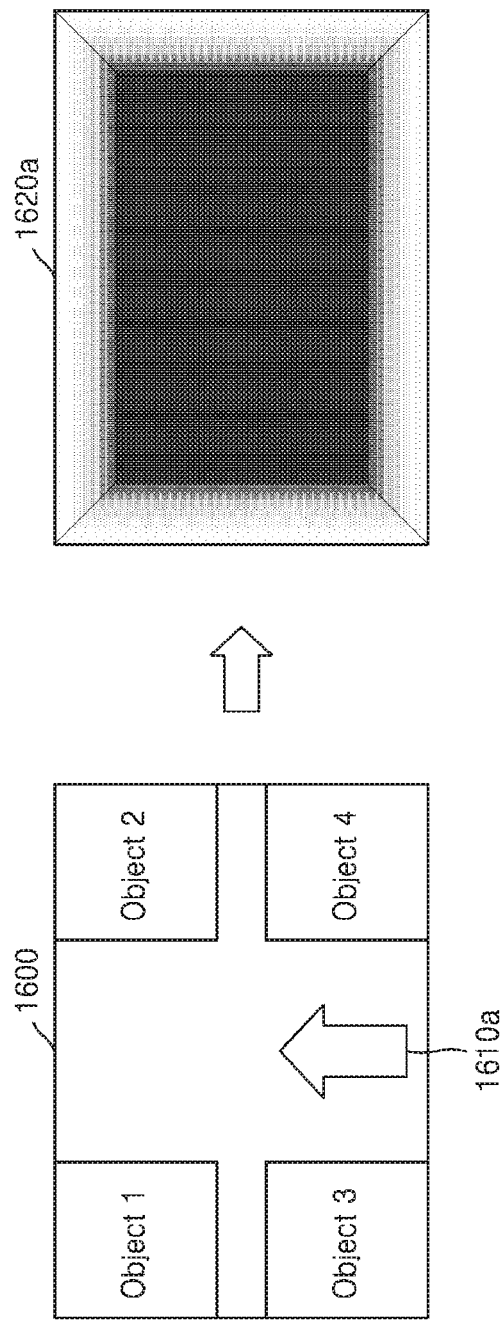
FIGS. 16A and 16B illustrate an exemplary navigating of a virtual tour based on a depth map, according to an embodiment.
Figure 16B:
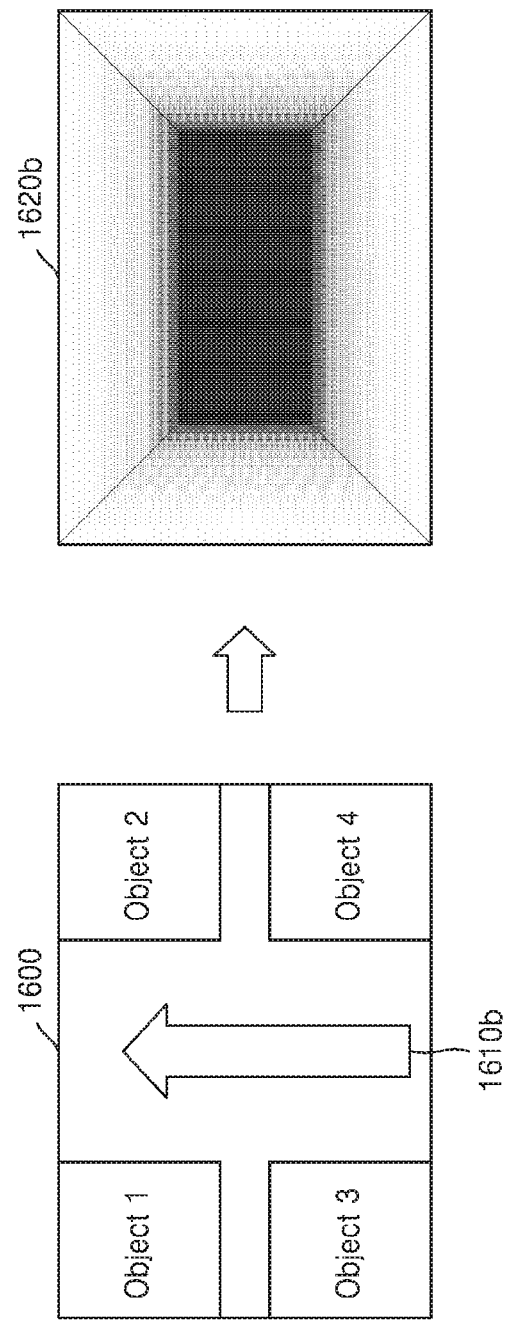

FIG. 15 illustrates an exemplary method of image registration based on distances between points, according to an embodiment. FIGS. 16A and 16B illustrate an exemplary navigating of a virtual tour based on a depth map, according to an embodiment.

At operation 1500, distances between points of a set of images may be calculated. As an example and not by way of limitation, the distances between the points of the set of images may be determined according to an image analysis of the set of images. As an example and not by way of limitation, the image analysis may be based on optical flow of the set of images, or focus of attention and focus of expansion between the set of images. In particular embodiments, the distance between the points of the set of images may be determined based on information sensed during capture of the set of images. The sensed information may be used to count steps taken between locations where the set of images are captured, and the distance between the points of the set of images may be determined based on the number of steps.

At operation 1510, image registration may be performed based on the calculated distances. The method of image registration is described in connection with FIGS. 13 and 14.

In particular embodiments, depth values of a set of images in a depth map are determined based on distances between points of the set of images. In particular embodiments, the depth map may be generated using alignment factor, or calibration data of the set of images. The depth map is characterized by the amount of user walked into the scene. As the user walks less into the scene in the virtual tour, a depth value may decrease in the depth map accordingly, that is, a distance that the user walks into the scene in the virtual tour may be proportional to difference between depth values of images before and after the user walk.

As shown in the FIG. 16A, a movement 1610a in the virtual tour 1600, may correspond to changes of a depth value in a depth map 1620a. Referring FIG. 16B, when a movement 1610b is made in the virtual tour 1600, a depth value may increase more than ones caused by movement 1610a.

Figure 17:
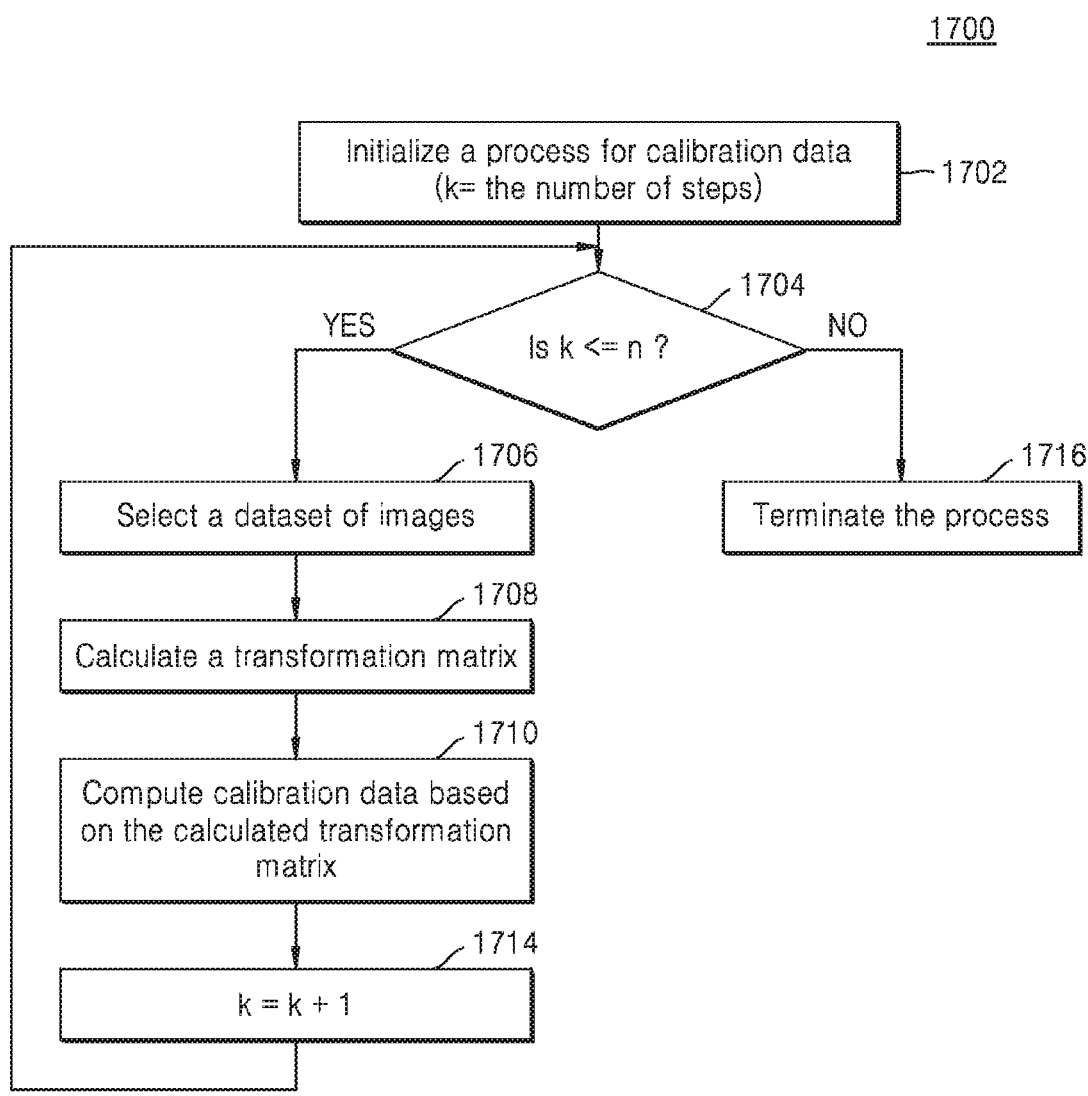
FIG. 17 illustrates an exemplary method for computing calibration data, according to an embodiment.

FIG. 17 illustrates an exemplary method 1700 for computing calibration data, according to an embodiment.

At operation 1702, process for calibrating data may be initialized, and the processor may be based on the number of steps (k) within a step limit of 'n'.

When the number of steps (k) is less than or equal to 'n', a dataset of images may be selected, at operation 1706.

At operation 1708, a transformation matrix may be calculated using image registration of a set of images. At operation 1710, calibration data may be computed based on the calculated transformation matrix. In particular embodiments, the calibration data for the set of images may be an average of the transformation matrix. At operation 1714, the value of 'k' is increased by 1 (i.e., k=k+1). Operations 1704, 1706, 1708, 1710, and 1714 may be repeated until 'k' becomes higher than 'n'

At operation 1704, when it is determined that the value of 'k' is not less than or not equal to 'n', the process may be terminated.

Figure 18:
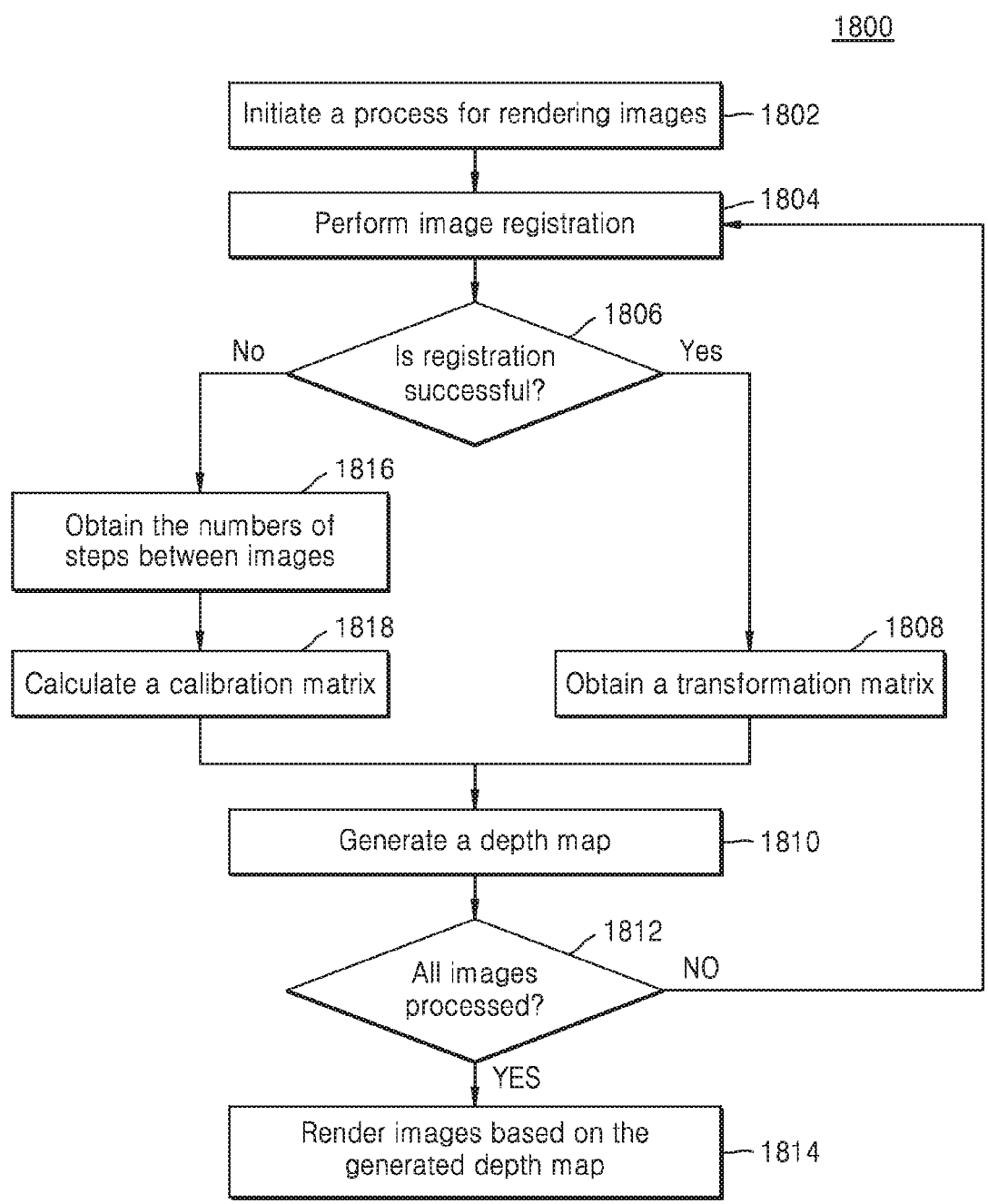
FIG. 18 illustrates an exemplary method for rendering a virtual tour, according to an embodiment.

FIG. 18 illustrates an exemplary method 1800 for rendering a virtual tour, according to an embodiment.

At operation 1802, a process for rendering the set of images may be initiated. At operation 1804, image registration is performed on the set of images. The image registration method for generating the depth map is described in conjunction with the FIGS. 13 and 14.

When it is determined at operation 1806, that the set of images are registered successfully, at operation 1808, the transformation matrix may be obtained, and then a depth map is generated at operation 1810.

When it is determined at operation 1812, that all images are processed then, at operation 1814, the virtual tour is rendered based on the generated depth map.

When it is determined, at operation 1806, that a set of images are not registered successfully, at operation 1816, numbers of steps between the set of images may be obtained, and the depth map may be generated by using the numbers of steps, and which is described in conjunction with the FIG. 15. At operation 1818, a calibration matrix may be calculated based on an image registration of a set of images using the calibration data which is described in conjunction with the FIG. 17.

In an embodiment, an artificial 3-D effect may be generated based on the depth maps while the set of images are displayed. In particular embodiments, the depth map may be generated based on the image registration of the set of images when the image registration is successful. In the case of failure of the image registration, the numbers of steps between the set of images may be used to generate the depth map.

Figure 19:
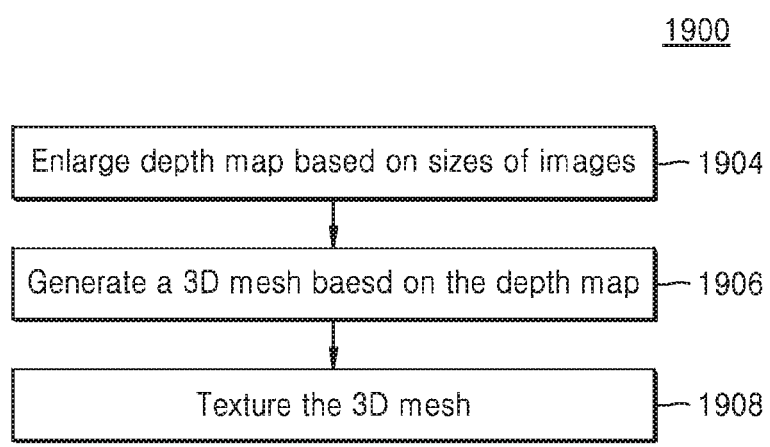
FIG. 19 illustrates an exemplary method for converting a two dimensional (2D) image to a three dimensional (3D) image using a depth map, according to an embodiment.

FIG. 19 illustrates an exemplary method 1900 for converting a two dimensional (2D) image to a three dimensional (3D) image using a depth map, according to an embodiment.

At operation 1904, areas corresponding to registered images in a depth map may be enlarged based on sizes of a set of images. In particular embodiments, the areas corresponding to the registered images in the depth map may be enlarged based on rectangular transition coordinates of the set of images.

Figure 20:
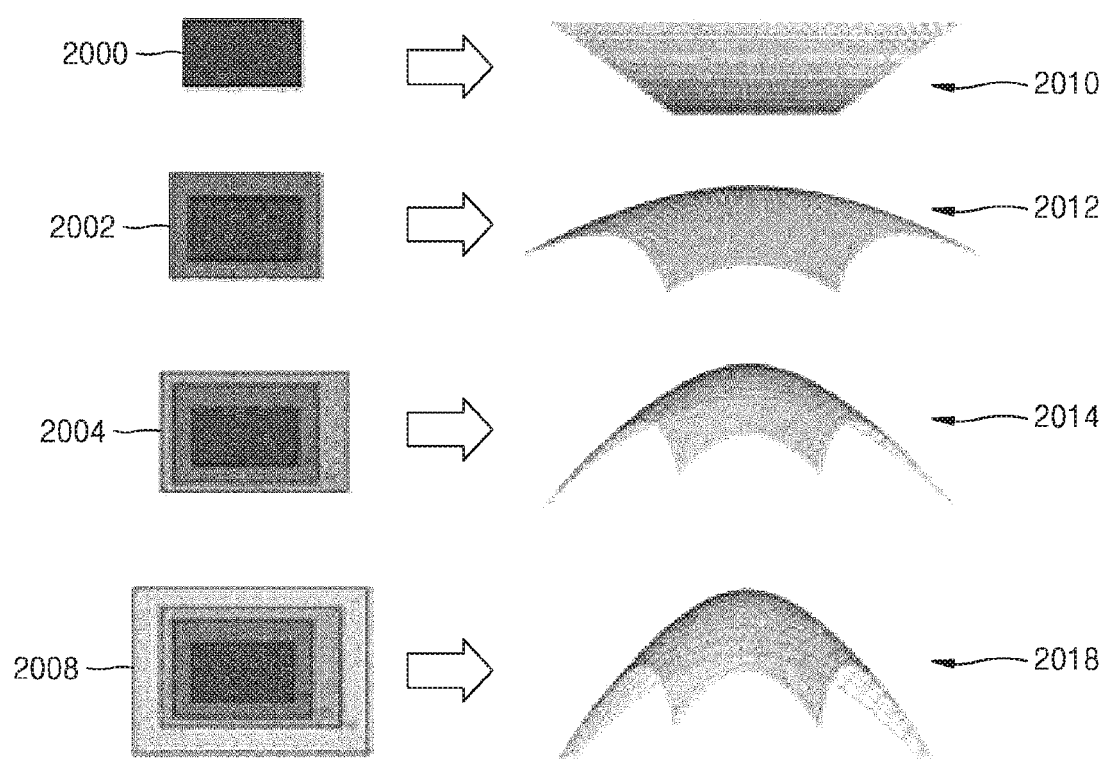
FIG. 20 illustrates exemplary of 3D meshes.

At operation 1906 3D mesh may be generated based on the depth map. At operation 1908, the generated 3D mesh may be textured. For explanation of 3D mesh, FIG. 20 is referred together. FIG. 20 illustrates exemplary of 3D meshes. The sample meshes 2010, 2012, 2014, and 2018 for rectangular transition coordination 2000, 2002, 2004, and 2008 are shown in the FIG. 20.

Figure 21:
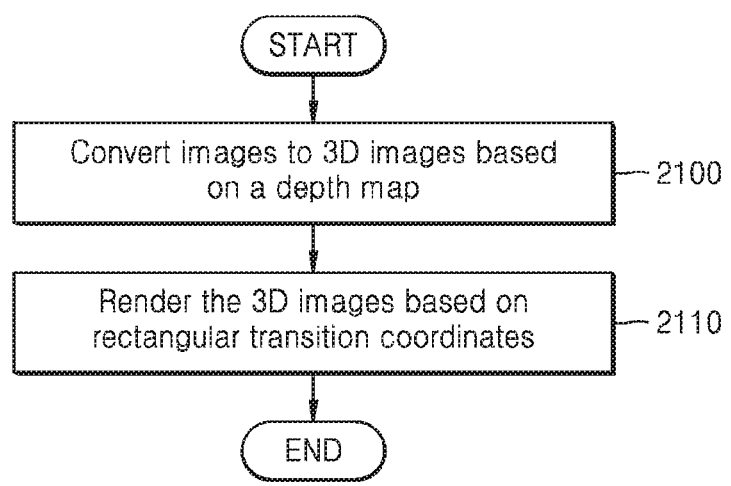
FIG. 21 illustrates an exemplary method for rendering 3D images, according to an embodiment.

FIG. 21 illustrates an exemplary method for rendering 3D images, according to an embodiment.

At operation 2100, 2D images may be converted to 3D images based on a depth map.

At operation 2110, the 3D images may be rendered based on rectangular transition coordinates of a set of images. The rendering may be performed based on a depth value. For example, the rendering may be performed on images with lower depth values earlier than ones with higher depth value.

According to an embodiment, artificial depth may be given to the image scene by a depth map. The navigating of a virtual tour may start at an image with the lowest depth value, and proceed according to depth values of images. A position of a virtual camera may be placed at a point corresponding to the image with the lowest depth value. The virtual camera may be moved to a point corresponding to an image with the highest depth value. In case of image alignment being successful, alignment factors may be considered to generate the depth map. Depth levels of the depth map may be determined based on sequence of transformation. A route in the virtual tour may be determined based on the sequence of the transformation. Depth levels of the depth map may be determined based on sequence of image registration. A route in the virtual tour may be determined based on the sequence of the image registration.

In particular embodiments, a depth map for a set of images, and turn alignments for turn images may be calculated during capture of images.

Different depth levels in the depth map may cause a user to be immersed in a virtual environment.

Figure 22:
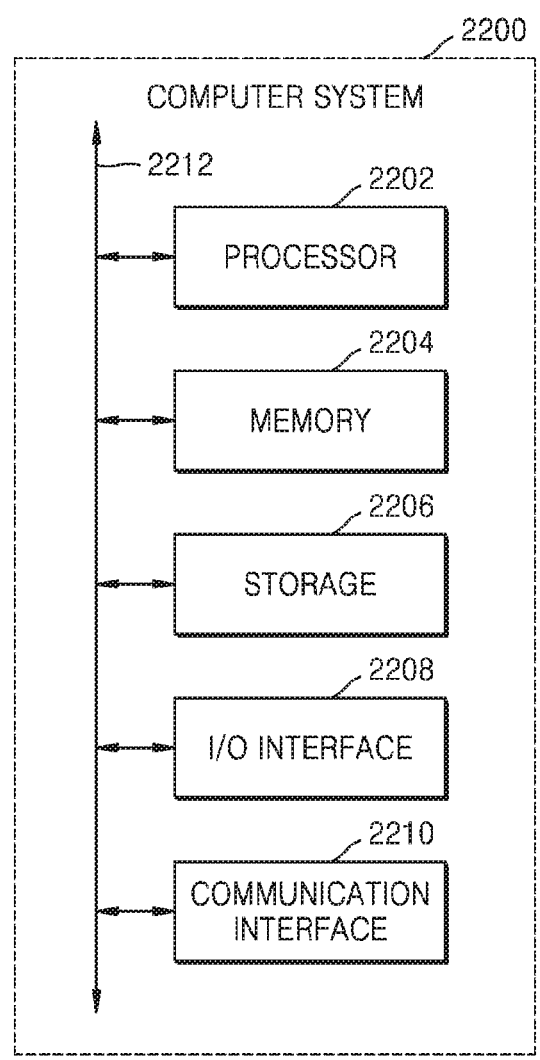
FIG. 22 illustrates an exemplary computer system in which embodiments can be implemented.

FIG. 22 illustrates an exemplary computer system in which embodiments can be implemented. In particular embodiments, one or more computer systems 2200 perform one or more operations of one or more methods described or illustrated herein. In particular embodiments, one or more computer systems 2200 provide functionality described or illustrated herein. In particular embodiments, software running on one or more computer systems 2200 performs one or more operations of one or more methods described or illustrated herein or provides functionality described or illustrated herein. Particular embodiments include one or more portions of one or more computer systems 2200. Herein, reference to a computer system may encompass a computing device, and vice versa, where appropriate. Moreover, reference to a computer system may encompass one or more computer systems, where appropriate.

This disclosure contemplates any suitable number of computer systems 2200. This disclosure contemplates computer system 2200 taking any suitable physical form. As example and not by way of limitation, computer system 2200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2200 may include one or more computer systems 2200; be unitary or distributed; span multiple locations; span multiple machines; span multiple data centers; or reside in a cloud, which may include one or more cloud components in one or more networks. Where appropriate, one or more computer systems 2200 may perform without substantial spatial or temporal limitation one or more operations of one or more methods described or illustrated herein. As an example and not by way of limitation, one or more computer systems 2200 may perform in real time or in batch mode one or more operations of one or more methods described or illustrated herein. One or more computer systems 2200 may perform at different times or at different locations one or more operations of one or more methods described or illustrated herein, where appropriate.

In particular embodiments, computer system 2200 includes a processor 2202, memory 2204, storage 2206, an input/output (I/O) interface 2208, a communication interface 2210, and a bus 2212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2202 includes hardware for executing instructions, such as those making up a computer program. As an example and not by way of limitation, to execute instructions, processor 2202 may retrieve (or fetch) the instructions from an internal register, an internal cache, memory 2204, or storage 2206; decode and execute them; and then write one or more results to an internal register, an internal cache, memory 2204, or storage 2206. In particular embodiments, processor 2202 may include one or more internal caches for data, instructions, or addresses. This disclosure contemplates processor 2202 including any suitable number of any suitable internal caches, where appropriate. As an example and not by way of limitation, processor 2202 may include one or more instruction caches, one or more data caches, and one or more translation lookaside buffers (TLBs). Instructions in the instruction caches may be copies of instructions in memory 2204 or storage 2206, and the instruction caches may speed up retrieval of those instructions by processor 2202. Data in the data caches may be copies of data in memory 2204 or storage 2206 for instructions executing at processor 2202 to operate on; the results of previous instructions executed at processor 2202 for access by subsequent instructions executing at processor 2202 or for writing to memory 2204 or storage 2206; or other suitable data. The data caches may speed up read or write operations by processor 2202. The TLBs may speed up virtual-address translation for processor 2202. In particular embodiments, processor 2202 may include one or more internal registers for data, instructions, or addresses. This disclosure contemplates processor 2202 including any suitable number of any suitable internal registers, where appropriate. Where appropriate, processor 2202 may include one or more arithmetic logic units (ALUs); be a multi-core processor; or include one or more processors 2202. Although this disclosure describes and illustrates a particular processor, this disclosure contemplates any suitable processor.

In particular embodiments, memory 2204 includes main memory for storing instructions for processor 2202 to execute or data for processor 2202 to operate on. As an example and not by way of limitation, computer system 2200 may load instructions from storage 2206 or another source (such as, for example, another computer system 2200) to memory 2204. Processor 2202 may then load the instructions from memory 2204 to an internal register or internal cache. To execute the instructions, processor 2202 may retrieve the instructions from the internal register or internal cache and decode them. During or after execution of the instructions, processor 2202 may write one or more results (which may be intermediate or final results) to the internal register or internal cache. Processor 2202 may then write one or more of those results to memory 2204. In particular embodiments, processor 2202 executes only instructions in one or more internal registers or internal caches or in memory 2204 (as opposed to storage 2206 or elsewhere) and operates only on data in one or more internal registers or internal caches or in memory 2204 (as opposed to storage 2206 or elsewhere). One or more memory buses (which may each include an address bus and a data bus) may couple processor 2202 to memory 2204. Bus 2212 may include one or more memory buses, as described below. In particular embodiments, one or more memory management units (MMUs) reside between processor 2202 and memory 2204 and facilitate accesses to memory 2204 requested by processor 2202. In particular embodiments, memory 2204 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 2204 may include one or more memories 2204, where appropriate. Although this disclosure describes and illustrates particular memory, this disclosure contemplates any suitable memory.

In particular embodiments, storage 2206 includes mass storage for data or instructions. As an example and not by way of limitation, storage 2206 may include a hard disk drive (HDD), a floppy disk drive, flash memory, an optical disc, a magneto-optical disc, magnetic tape, or a Universal Serial Bus (USB) drive or a combination of two or more of these. Storage 2206 may include removable or non-removable (or fixed) media, where appropriate. Storage 2206 may be internal or external to computer system 2200, where appropriate. In particular embodiments, storage 2206 is non-volatile, solid-state memory. In particular embodiments, storage 2206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2206 taking any suitable physical form. Storage 2206 may include one or more storage control units facilitating communication between processor 2202 and storage 2206, where appropriate. Where appropriate, storage 2206 may include one or more storages 2206. Although this disclosure describes and illustrates particular storage, this disclosure contemplates any suitable storage.

In particular embodiments, I/O interface 2208 includes hardware, software, or both, providing one or more interfaces for communication between computer system 2200 and one or more I/O devices. Computer system 2200 may include one or more of these I/O devices, where appropriate. One or more of these I/O devices may enable communication between a person and computer system 2200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2208 for them. Where appropriate, I/O interface 2208 may include one or more device or software drivers enabling processor 2202 to drive one or more of these I/O devices. I/O interface 2208 may include one or more I/O interfaces 2208, where appropriate. Although this disclosure describes and illustrates a particular I/O interface, this disclosure contemplates any suitable I/O interface.

In particular embodiments, communication interface 2210 includes hardware, software, or both providing one or more interfaces for communication (such as, for example, packet-based communication) between computer system 2200 and one or more other computer systems 2200 or one or more networks. As an example and not by way of limitation, communication interface 2210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2210 for it. As an example and not by way of limitation, computer system 2200 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 2200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2200 may include any suitable communication interface 2210 for any of these networks, where appropriate. Communication interface 2210 may include one or more communication interfaces 2210, where appropriate. Although this disclosure describes and illustrates a particular communication interface, this disclosure contemplates any suitable communication interface.

In particular embodiments, bus 2212 includes hardware, software, or both coupling components of computer system 2200 to each other. As an example and not by way of limitation, bus 2212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2212 may include one or more buses 2212, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, or operations, any of these embodiments may include any combination or permutation of any of the components, elements, functions, or operations described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A non-transitory computer-readable storage medium comprising instructions which, when executed, cause an electronic device to:
   display a first image, which corresponds to a first point included among a plurality of points along a predetermined route in a virtual tour, and a map including the predetermined route; and
   display, in response to an input, a second image which corresponds to a second point included among the plurality of points and is different from the first point,
   wherein the first point and the second point are sequential in the plurality of points along the predetermined route,
   wherein the first image and the second image respectively correspond to a first depth value and a second depth value in a same depth map generated as a result of registering the second image to the first image, and
   wherein when changing from the display of the first image to the display of the second image, a transition effect is displayed based on the depth map.

2. The storage medium of claim 1, wherein the first point is indicated on the predetermined route in the map while the first image is displayed, and the second point is indicated on the predetermined route in the map while the second image is displayed.

3. The storage medium of claim 1, wherein the first image corresponds to a first area in the depth map, and the second image corresponds to a second area overlapped with at least a part of the first area in the depth map.

4. The storage medium of claim 3,
   wherein a difference between the first depth value and the second depth value corresponds to a distance between the first point and the second point, and a relationship between the first area and the second area corresponds to orientation angles of the first point and the second point with respect to at least one reference point, and
   wherein the at least one reference point includes at least one of a current point among the plurality of points, a first prior point of the first point, a second prior point of the second point, a first next point of the first point, or a second next point of the second point.

5. The storage medium of claim 4, wherein the distance between the first point and the second point and the orientation angles are determined based on at least one of an image analysis of the first image and the second image, and information sensed during captures of the first image and the second image.

6. The storage medium of claim 1,
   wherein the instructions further cause the electronic device to display at least one indicator corresponding to locations of the first point and the second point on the predetermined route in the virtual tour, and orientation angles of the first point and the second point with respect to at least one reference point, and
   wherein the at least one reference point includes at least one of a current point among the plurality of points, a first prior point of the first point, a second prior point of the second point, a first next point of the first point, or a second next point of the second point.

7. The storage medium of claim 6, wherein the locations and the orientation angles are determined based on at least one of an image analysis of the first image and the second image, and information sensed during capturing of the first image and the second image.

8. The storage medium of claim 6, wherein the at least one indicator corresponds to a distance between the first point and the second point, and the distance is determined based on steps sensed during capturing of the first image and the second image.

9. The storage medium of claim 1, wherein the instructions further cause the electronic device to display:
   a first indicator corresponding to locations of the first point and a third point located between the first point and the second point in the predetermined route and orientation angles of the first point and the third point with respect to at least one second reference point including at least one of a current point among the plurality of points, a first prior point of the first point, a second prior point of the second point, a third prior point of the third point, a first next point of the first point, a second next point of the second point, or a third next point of the third point, and
   a second indicator corresponding to the location of the third point and a location of the second point and orientation angles of the third point and the second point with respect to the at least one second reference point.

10. The storage medium of claim 9, wherein a third image corresponding to the third point is displayed before the second image is displayed.

11. The storage medium of claim 1, wherein the first image is included in a first set of images and the second image is included in a second set of images, and points corresponding to turn images are located between the first point and the second point in the predetermined route.

12. The storage medium of claim 11, wherein the instructions further cause the electronic device to render the virtual tour by blending the turn images, the first set of images, and the second set of images.

13. An electronic device comprising:
a display configured to display a virtual tour; and
a processor configured to:
control the display to display a first image, which corresponds to a first point included among a plurality of points along a predetermined route in the virtual tour, and a map including the predetermined route, and
control the display to display, in response to an input, a second image which corresponds to a second point included among the plurality of points and is different from the first point, wherein the first point and the second point are sequential in the plurality of points along the predetermined route,
wherein the first image and the second image respectively correspond to a first depth value and a second depth value in a same depth map generated as a result of registering the second image to the first image, and
wherein when changing from the display of the first image to the display of the second image, a transition effect is displayed based on the depth map.

14. The device of claim 13, wherein the first point is indicated on the predetermined route in the map while the first image is displayed, and the second point is indicated on the predetermined route in the map while the second image is displayed.

15. The device of claim 13, wherein the first image corresponds to a first area in the depth map, and the second image corresponds to a second area overlapped with at least a part of the first area in the depth map.

16. The device of claim 13, wherein the processor is further configured to control the display to display:
a first indicator corresponding to locations of the first point and a third point located between the first point and the second point in the predetermined route and orientation angles of the first point and the third point with respect to at least one second reference point including at least one of a current point among the plurality of points, a first prior point of the first point, a second prior point of the second point, a third prior point of the third point, a first next point of the first point, a second next point of the second point, or a third next point of the third point, and
a second indicator corresponding to the location of the third point and a location of the second point and orientation angles of the third point and the second point with respect to the at least one second reference point.

17. The device of claim 13,
wherein the processor is further configured to control the display to display at least one indicator corresponding to locations of the first point and the second point on the predetermined route in the virtual tour, and orientation angles of the first point and the second point with respect to at least one reference point, and
wherein the at least one reference point includes at least one of a current point among the plurality of points, a first prior point of the first point, a second prior point of the second point, a first next point of the first point, or a second next point of the second point.

18. A method comprising:
displaying a first image, which corresponds to a first point included among a plurality of points along a predetermined route in a virtual tour, and a map including the predetermined route; and
displaying, in response to an input, a second image which corresponds to a second point included among the plurality of points and is different from the first point, wherein the first point and the second point are sequential in the plurality of points along the predetermined route,
wherein the first image and the second image respectively correspond to a first depth value and a second depth value in a same depth map generated as a result of registering the second image to the first image, and
wherein when changing from the display of the first image to the display of the second image, a transition effect is displayed based on the depth map.

19. The storage medium of claim 1, wherein the first point and the second point are positions at which the first image and the second image were captured respectively.

* * * * *